US012221818B1

(12) United States Patent
Edlin et al.

(10) Patent No.: US 12,221,818 B1
(45) Date of Patent: Feb. 11, 2025

(54) SECURITY SLIDING BARRIER

(71) Applicant: Unique Home Designs, Inc., Gilbert, AZ (US)

(72) Inventors: David Neil Edlin, Chiang Mai (TH); Peter Syme Taylor, New Farm (AU); Lawrence Robert Chavez, Gilbert, AZ (US)

(73) Assignees: Unique Home Designs, Inc., Gilbert, AZ (US); MESHTEC INTERNATIONAL CO., LTD. (TH)

( * ) Notice: Subject to any disclaimer, the term of this patent is extended or adjusted under 35 U.S.C. 154(b) by 0 days.

(21) Appl. No.: 18/231,728

(22) Filed: Aug. 8, 2023

Related U.S. Application Data

(63) Continuation-in-part of application No. 17/179,026, filed on Feb. 18, 2021, now abandoned.

(60) Provisional application No. 62/978,275, filed on Feb. 18, 2020.

(51) Int. Cl.

| | |
|---|---|
| ***E05D 15/00*** | (2006.01) |
| ***E05B 15/02*** | (2006.01) |
| ***E05C 9/02*** | (2006.01) |
| ***E05D 15/06*** | (2006.01) |
| ***E06B 3/46*** | (2006.01) |

(52) U.S. Cl.
CPC ........ *E05D 15/0669* (2013.01); *E05B 15/024* (2013.01); *E05C 9/02* (2013.01); *E05D 15/0691* (2013.01); *E06B 3/4609* (2013.01); *E06B 3/4636* (2013.01)

(58) Field of Classification Search
CPC ............. E05D 15/0669; E05D 15/0691; E05B 15/024; E05C 9/02; E06B 3/4609; E06B 3/4636
See application file for complete search history.

(56) References Cited

U.S. PATENT DOCUMENTS

| | | | |
|---|---|---|---|
| 3,995,398 | A | 12/1976 | Marulic |
| 9,316,045 | B2 * | 4/2016 | Kim ...................... E06B 3/4618 |
| 10,738,521 | B2 * | 8/2020 | Hamilton ............ E05D 15/0634 |
| 2004/0244296 | A1 | 12/2004 | Dinkelborg |
| 2005/0000164 | A1 | 1/2005 | Jacobs |
| 2015/0247358 | A1 | 9/2015 | Kim |

FOREIGN PATENT DOCUMENTS

| | | |
|---|---|---|
| GB | 2550534 | 11/2017 |

* cited by examiner

*Primary Examiner* — Daniel J Troy
*Assistant Examiner* — Daniel Alvarez
(74) *Attorney, Agent, or Firm* — Booth Udall Fuller, PLC; Kenneth C. Booth

(57) ABSTRACT

A security sliding barrier with a sliding panel, a fixed panel, a latch channel, a lock, a strike plate, and an interlock assembly. The sliding panel is positioned between the latch channel and the fixed panel. The latch channel mounts to the frame distal to the fixed panel and the lock is mounted on the sliding panel and extends toward the latch channel. The strike plate is attached to the latch channel and has a receiver aligned with the lock that receives the lock when the security sliding barrier moves to a closed position, locking the first side of the sliding panel to the latch channel. The interlock assembly has a fixed interlock on the fixed panel and a sliding interlock on the sliding panel that engage when the security sliding barrier is in the closed position, locking the second side of the sliding panel to the fixed panel.

20 Claims, 41 Drawing Sheets

SECURITY SLIDING BARRIER

CROSS REFERENCE TO RELATED APPLICATIONS

This application is a continuation-in-part application of U.S. patent application Ser. No. 17/179,026 entitled “MOUNTING APPARATUS FOR SECURITY SLIDING BARRIER” to Edlin, et al. that was filed on Feb. 18, 2021, which claims the benefit of the filing date of U.S. Provisional Patent Application 62/978,275 entitled “MOUNTING APPARATUS FOR SECURITY SLIDING BARRIER” to Edlin, et al. that was filed on Feb. 18, 2020, the disclosure of which is hereby incorporated herein by this reference.

TECHNICAL FIELD

Aspects of this document relate generally to security sliding barrier for a door or window or other structure, and more specifically to security sliding barrier that uses the existing slide track for a sliding window or door or other structure to securely establish and retain the security sliding barrier.

BACKGROUND

Sliding barriers, such as sliding doors or windows, conventionally come encased in a sash that slides along tracks installed in a frame or entryway. These sliding barriers are particularly vulnerable to failure or unauthorized entry. Some sliding doors may simply be lifted off the tracks to provide a point of entry into a dwelling. Other sliding doors may be made of structurally weak materials so that the door bends or easily gives upon the application of force. A common complaint in the door and window industry is having flimsy screens coming off the tracks and offering no security.

Conventional solutions for securing sliding doors include adding additional locks or latches, replacing the existing locks, or adding bars on the tracks to limit the slidability of the doors. But most of these existing solutions involve the use of the existing sash and tracks because they are already permanently attached to the frame of the home and are difficult to remove and replace. Security sliding doors, including those with mesh materials, are different from conventional insect screens and sliding glass doors and windows in that the mesh, door and window materials are more durable and resistant to penetration. Other solutions to strengthen the security features of a sliding door or window system include entirely replacing the sliding doors with more structurally sound doors as well as the tracks on which the sliding doors slide. But replacing the doors and windows and the existing tracks on which the sliding doors and windows slide can be expensive.

SUMMARY

Aspects of this document relate to a security sliding barrier for a window or door, comprising a sliding panel configured to sit within a frame of the window or door and impede passage of objects through the window or door, a sash assembly surrounding the sliding panel, the sash assembly having a top sash, a bottom sash, a first side sash, and a second side sash, wherein each of the top sash, the bottom sash, the first side sash, and the second side sash has an inner side configured to couple with the sliding panel and an outer side facing away from the sliding panel, at least two top rollers extending away from the outer side of the top sash and configured to engage with a top track of the frame, at least two bottom rollers extending away from the outer side of the bottom sash and configured to engage with a bottom track of the frame, a latch channel configured to mount to the frame, a lock mounted on the outer side of the first side sash, the lock comprising at least one protrusion configured to extend toward the latch channel, at least one adjustable strike plate configured to attach to the latch channel, each of the at least one adjustable strike plate having a receiver aligned with the at least one protrusion and configured to receive the at least one protrusion when the security sliding barrier moves to a closed position within the frame, wherein the at least one protrusion is slidable with respect to the first side sash in a direction parallel with the first side sash to lock the first side sash to the latch channel and the frame, and an interlock assembly having a fixed interlock and a sliding interlock, the fixed interlock configured to attach to a fixed panel within the frame, wherein the fixed panel is distal to the latch channel, the sliding interlock configured to attach to the second side sash of the sliding panel and engage with the fixed interlock when the security sliding barrier is in the closed position to lock the second side sash of the sliding panel to the fixed panel.

Particular embodiments may comprise one or more of the following features. A position of each of the at least two bottom rollers and each of the at least two top rollers with respect to the sliding panel may be individually adjustable. Each roller of the at least two bottom rollers may be pivotably coupled to the bottom sash and may have a corresponding adjustment assembly, the adjustment assembly comprising an end cap positioned on an end of the bottom sash, an adjustment block positioned within the bottom sash adjacent to the roller, and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom sash and when the adjustment screw is rotated in a second direction, the adjustment block is moved away from the roller and the roller is pivoted toward the bottom sash. The at least one protrusion may be a peg with a mushroom head configuration and the receiver of the at least one adjustable strike plate may be a keyhole slot. Each of the at least one adjustable strike plate may have an elongated hole extending therethrough and may be configured to slidably couple to the latch channel with a rivet or a fastener extending through the elongated hole. The security sliding barrier may further comprise a plurality of shims positioned between the latch channel and the frame, wherein each shim of the plurality of shims has a ridge on a first side of the shim and a groove on a second side of the shim opposite the first side, wherein each groove is configured to mate with the ridge of an adjacent shim to hold the plurality of shims together. The security sliding barrier may further comprise a locator tool configured to removably couple to the at least one protrusion, wherein when the locator tool is coupled to the at least one protrusion, the locator tool is configured to extend into the receiver of the at least one adjustable strike plate and adjust the position of the at least one adjustable strike plate to center the at least one protrusion within the receiver.

Aspects of this document relate to a security sliding barrier for a window or door, comprising a sliding panel configured to sit within a frame of the window or door and impede passage of objects through the window or door, at least two bottom rollers extending away from a bottom of the sliding panel and configured to engage with a bottom track of the frame, a latch channel configured to mount to the frame, a lock mounted on a first side of the sliding panel, the lock comprising at least one protrusion configured to extend toward the latch channel, at least one strike plate configured to attach to the latch channel, each of the at least one strike plate having a receiver aligned with the at least one protrusion and configured to receive the at least one protrusion when the security sliding barrier moves to a closed position within the frame, wherein the at least one protrusion is slidable with respect to the sliding panel in a direction parallel with the first side of the sliding panel to lock the sliding panel to the latch channel and the frame, and an interlock assembly having a fixed interlock and a sliding interlock, the fixed interlock configured to attach to a fixed panel within the frame, wherein the fixed panel is distal to the latch channel, the sliding interlock configured to attach to a second side of the sliding panel opposite the first side and engage with the fixed interlock when the security sliding barrier is in the closed position to lock the second side of the sliding panel to the fixed panel.

Particular embodiments may comprise one or more of the following features. A position of each of the at least two bottom rollers with respect to the sliding panel may be individually adjustable. Each roller of the at least two bottom rollers may be pivotably coupled to the bottom of the sliding panel and may have a corresponding adjustment assembly, the adjustment assembly comprising an end cap positioned on a corner of the sliding panel, an adjustment block positioned on the bottom of the sliding panel adjacent to the roller, and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom of the sliding panel and when the adjustment screw is rotated in a second direction, the adjustment block is moved away from the roller and the roller is pivoted toward the bottom of the sliding panel. Each of the at least one strike plate may have an elongated hole extending therethrough and may be configured to slidably couple to the latch channel with a rivet or a fastener extending through the elongated hole. The security sliding barrier may further comprise a plurality of shims positioned between the latch channel and the frame, wherein each shim of the plurality of shims has a ridge on a first side of the shim and a groove on a second side of the shim opposite the first side, wherein each groove is configured to mate with the ridge of an adjacent shim to hold the plurality of shims together. The security sliding barrier may further comprise a locator tool configured to removably couple to the at least one protrusion, wherein when the locator tool is coupled to the at least one protrusion, the locator tool is configured to extend into the receiver of the at least one strike plate and adjust the position of the at least one strike plate to center the at least one protrusion within the receiver.

Aspects of this document relate to a security sliding barrier for a window or door, comprising a sliding panel configured to sit within a frame of the window or door and impede passage of objects through the window or door, at least two bottom rollers extending below a bottom of the sliding panel and configured to engage with a bottom track of the frame, a lock mounted on a first side of the sliding panel and configured to lock the first side of the sliding panel to the frame when the security sliding barrier moves to a closed position within the frame, and an interlock assembly configured to lock a second side of the sliding panel opposite the first side to a fixed panel within the frame when the security sliding barrier is in the closed position.

Particular embodiments may comprise one or more of the following features. The security sliding barrier may further comprise a latch channel configured to mount to the frame, wherein the lock is configured to extend toward the latch channel and lock the first side of the sliding panel to the latch channel when the security sliding barrier moves to the closed position. The security sliding barrier may further comprise at least one strike plate configured to attach to the frame, wherein the lock comprises at least one protrusion configured to extend toward the at least one strike plate, each of the at least one strike plate having a receiver aligned with the at least one protrusion and configured to receive the at least one protrusion when the security sliding barrier moves to the closed position, wherein the at least one protrusion is slidable with respect to the sliding panel in a direction parallel with the first side of the sliding panel to lock the first side of the sliding panel to the frame. The interlock assembly may have a fixed interlock and a sliding interlock, the fixed interlock configured to attach to the fixed panel and the sliding interlock configured to attach to the second side of the sliding panel and engage with the fixed interlock when the security sliding barrier is in the closed position to lock the second side of the sliding panel to the fixed panel. A position of each of the at least two bottom rollers with respect to the sliding panel may be individually adjustable. Each roller of the at least two bottom rollers may be pivotably coupled to the bottom of the sliding panel and may have a corresponding adjustment assembly, each adjustment assembly comprising an end cap positioned on a corner of the sliding panel, an adjustment block positioned on the bottom of the sliding panel adjacent to the roller, and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom of the sliding panel and when the adjustment screw is rotated in a second direction, the adjustment block is moved away from the roller and the roller is pivoted toward the bottom of the sliding panel. Each of the at least one strike plate may have an elongated hole extending therethrough and may be configured to slidably couple to the latch channel with a rivet or a fastener extending through the elongated hole.

According to an embodiment, a sliding screen barrier is implemented to use existing sliding patio screen door or window tracks that are common to all conventional sliding patio screen door or windows. However, unique security features are added to ensure the sliding screen barrier is secure and does not suffer the same problems that exist with conventional security doors and windows. Additional security features include, but are not limited to, a unique strike plate, a lift protector at the corner, adjustable top and/or bottom channel caps, an interlock and a uniquely shaped lock. As described more fully below, one or more of these features provides for greater security at a lower cost because they use the existing sliding door or window sash and channels but provide secure attachment and restricted removal of the sliding screen barrier.

According to an embodiment, there is provided a mounting apparatus having a housing with an inner side opposing an outer side. A generally U-shaped channel runs along the inner side of the housing for receiving an edge portion of a sliding panel. At least one roller extends from the outer side for slidingly engaging a track.

In another embodiment, there is a provided a security sliding door having an upper member and a lower member for engaging a respective upper and lower edge portion of a sliding panel. Each member has a housing having a generally U-shaped channel running along an inner side of the housing for engaging the respective upper and lower edge portions of a sliding panel. Each member has at least one roller extending from an outer side of the housing that opposes the inner side of the housing, for slidingly engaging a respective upper and lower track.

An interlock assembly is also provided on the security sliding door having a fixed interlock secured to a fixed panel such as a window or door frame and having a sliding interlock secured to the sliding panel for engagement with the fixed interlock upon slidably closing the sliding window to limit lateral movement of the security sliding door.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements.

Figure 1A:
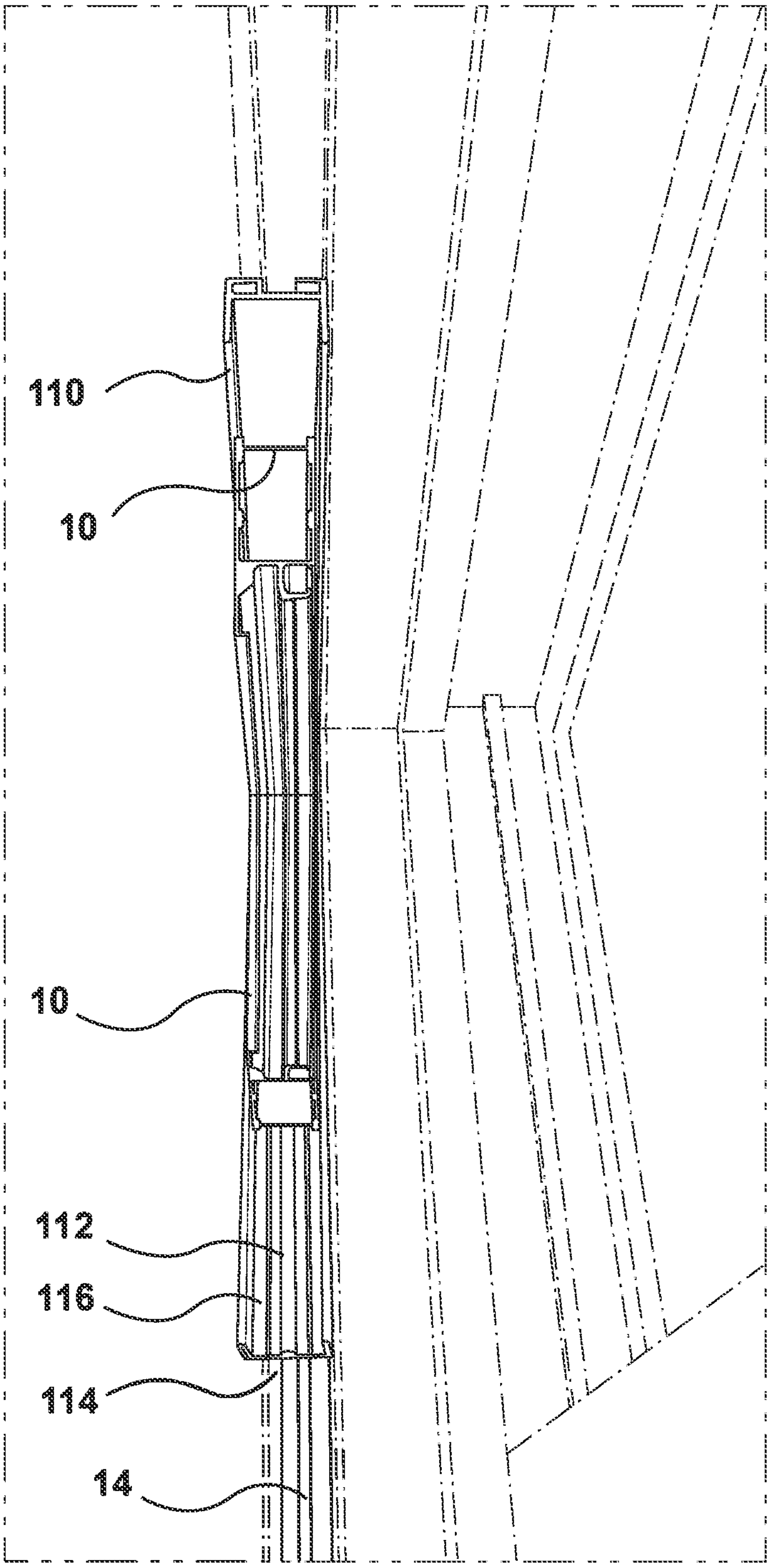
FIG. 1A illustrates a perspective cutaway view of a mounting apparatus encasing an edge portion of a sliding panel, according to an embodiment.
Figure 1B:
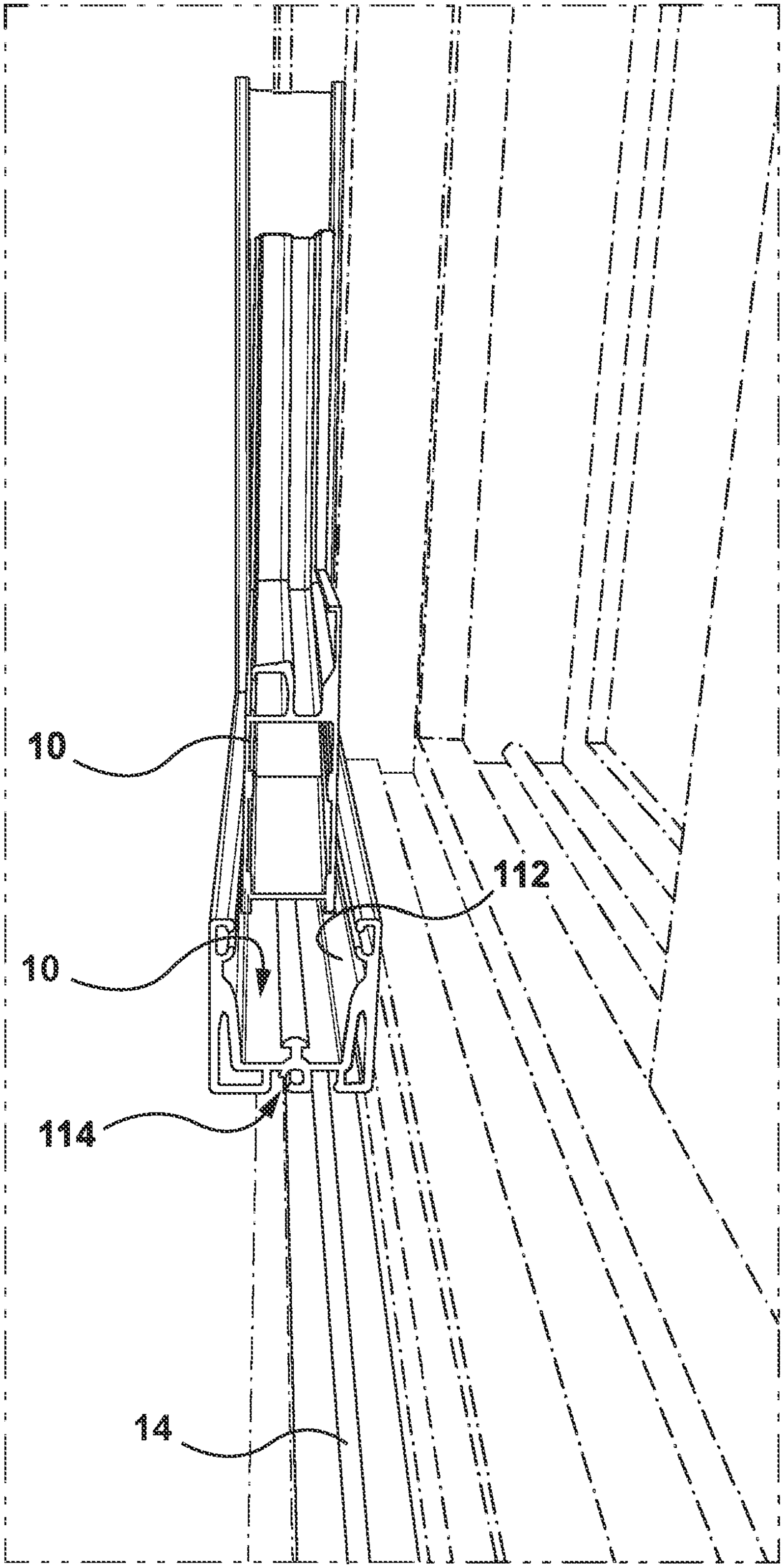
FIG. 1B illustrates another perspective cutaway view of the mounting apparatus of FIG. 1A, according to an embodiment.
Figure 1C:
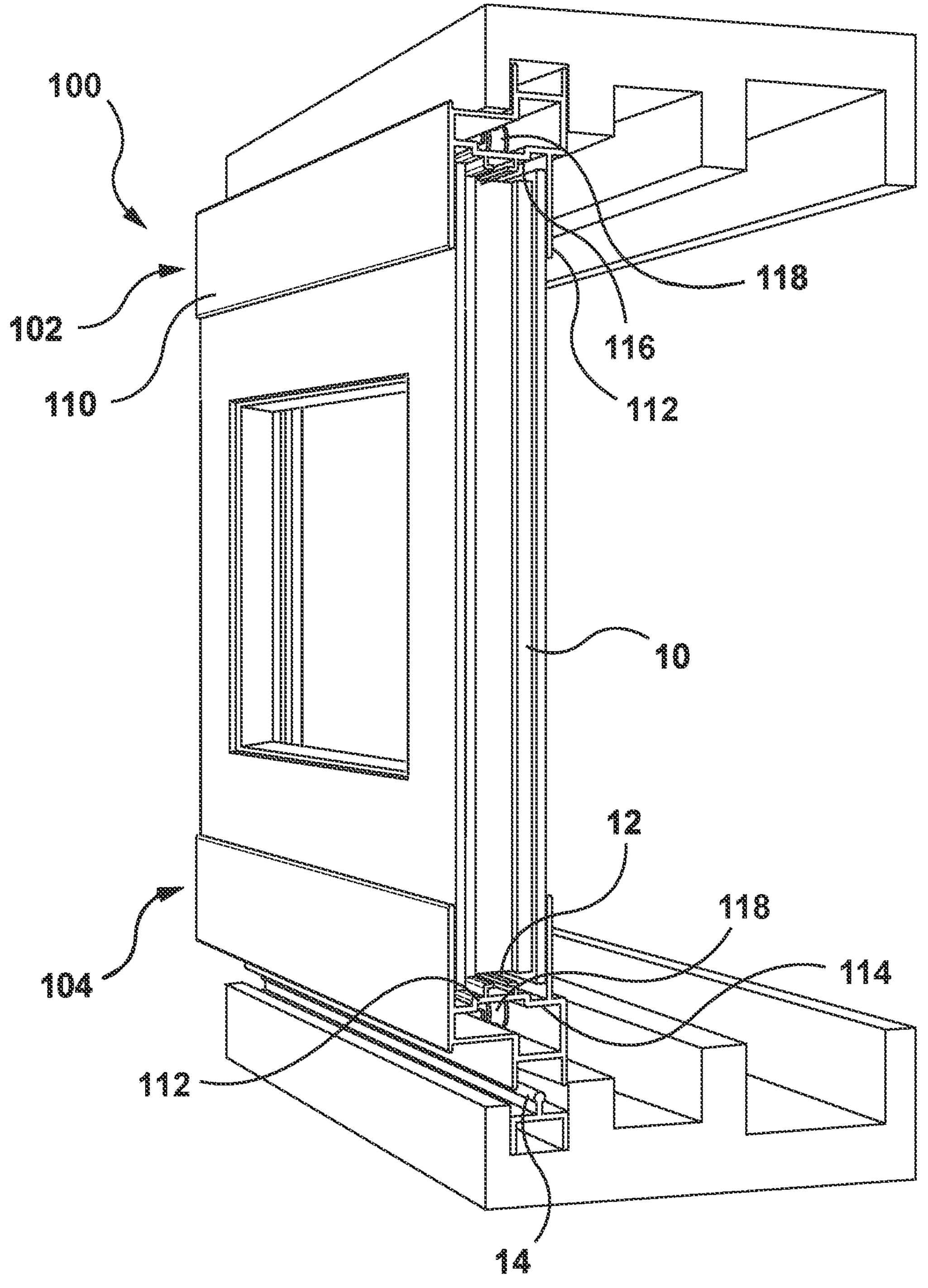
FIG. 1C illustrates a perspective view of a mounting apparatus having an upper and lower member and encasing an upper and lower edge portion of a sliding panel, according to an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms “a,” “an,” and “the” include plural referents unless the context clearly dictates otherwise. Thus, for example, reference to “a step” includes reference to one or more of such steps.

The word “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Throughout the description and claims of this specification, the words “comprise” and “contain” and variations of the words, for example “comprising” and “comprises”, mean “including but not limited to”, and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term “plurality”, as used herein, means more than one. When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a mounting apparatus 100 for securing a sliding panel 10 within a frame 16 of a window, doorway, window sash, sliding door, or sliding screen door. Windows and doorways with a sliding panel 10 frequently also have a fixed panel 18 that is stationary within the frame 16 (see FIG. 13). The mounting apparatus 100 used in connection with a sliding panel 10 provides a security sliding barrier 200 that is configured to secure a window or door and impede passage of objects through the window or door when in a closed position but is configured to slide or move to an open position that allows passage of objects through the window or door.

Figure 13:
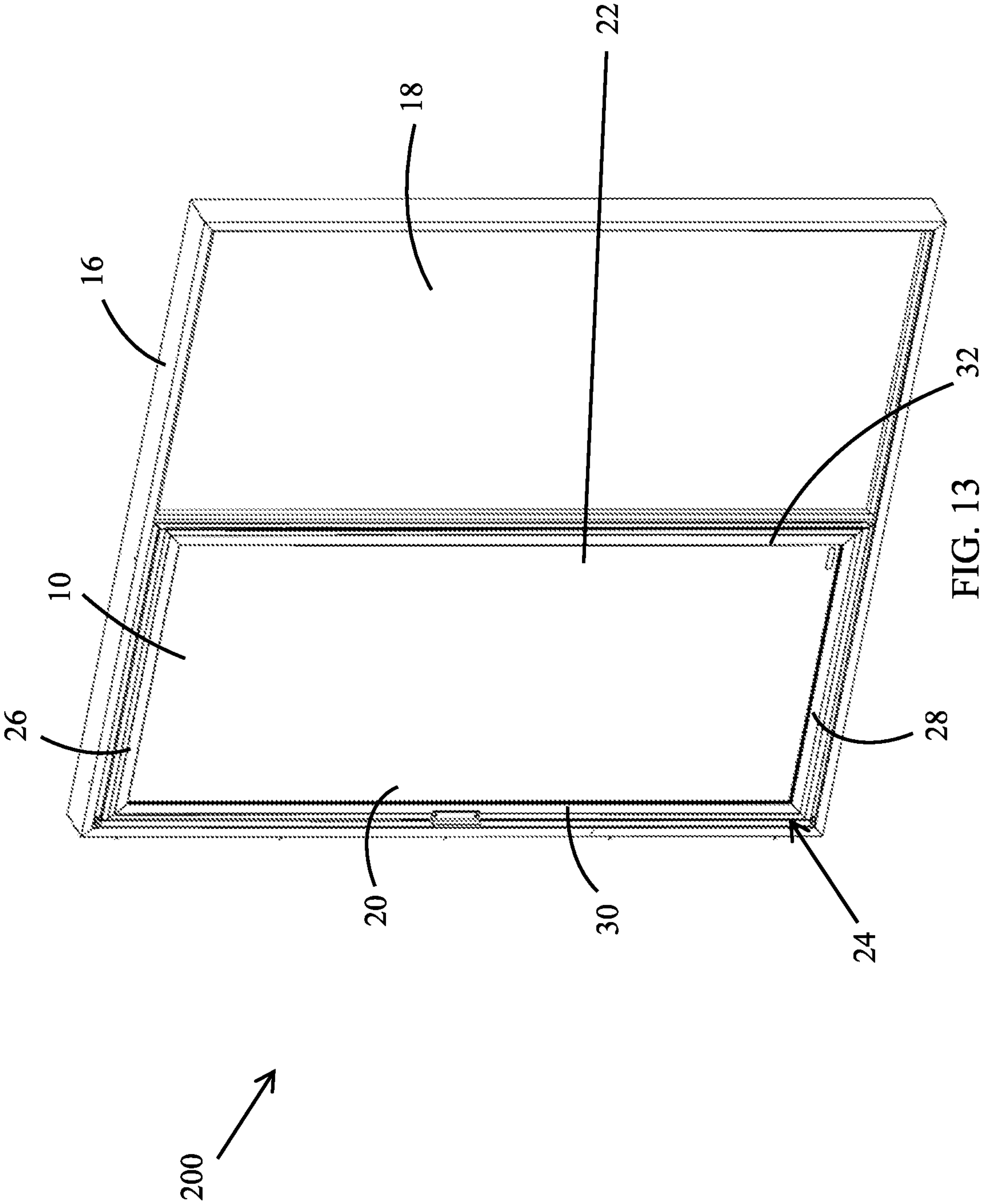
FIG. 13 illustrates a perspective view of a sliding panel installed in a frame with a fixed panel.

As will be described in more detail below and as shown in FIG. 13, the security sliding barrier 200 is configured to lock to the frame 16 on a first side 20 of the sliding panel 10 and to the fixed panel 18 or the frame 16 on a second side 22 of the sliding panel 10. By securing the first side 20 and the second side 22 of the sliding panel 10, the security sliding barrier 200 is much more difficult to remove from the window or doorway. Thus, the existing tracks 14, frame 16 and fixed panel 18 can be used with the security sliding barrier 200 to secure the window or doorway, which avoids the cost of installing a new track and/or frame.

In some embodiments, the sliding panel 10 has a sash assembly 24 surrounding the sliding panel 10. The sash assembly 24 has a top sash 26, a bottom sash 28, a first side sash 30, and a second side sash 32. The sash assembly 24 thus borders the sliding panel 10 and allows the sliding panel 10 to couple with additional components such as the mounting apparatus 100. Thus, each of the top sash 26, the bottom sash 28, the first side sash 30, and the second side sash 32 has an inner side configured to couple with the sliding panel 10 and an outer side facing away from the sliding panel 10.

Making reference to FIGS. 1A-3B, the mounting apparatus 100 may be provided for engaging an edge portion 12 of a sliding panel 10, such as the outer side of the sash assembly 24. As mentioned above, the sliding panel 10 is configured to sit within a frame 16 of a window or door and impede passage of objects through the window or door. In some embodiments, the sliding panel 10 is formed of a material that is configured to resist tearing, breaking, or penetration, thus increasing the security of the window or doorway when the sliding panel 10 covers the window or doorway. The mounting apparatus 100 has a housing 110 having an inner side 112 opposing an outer side 114. A generally U-shaped channel 116 may run along the inner side 112 of the housing 110 for receiving an edge 12 of a sliding panel 10. At least one roller 118 extends from the outer side 114 for slidingly engaging the track 14.

Figure 2B:
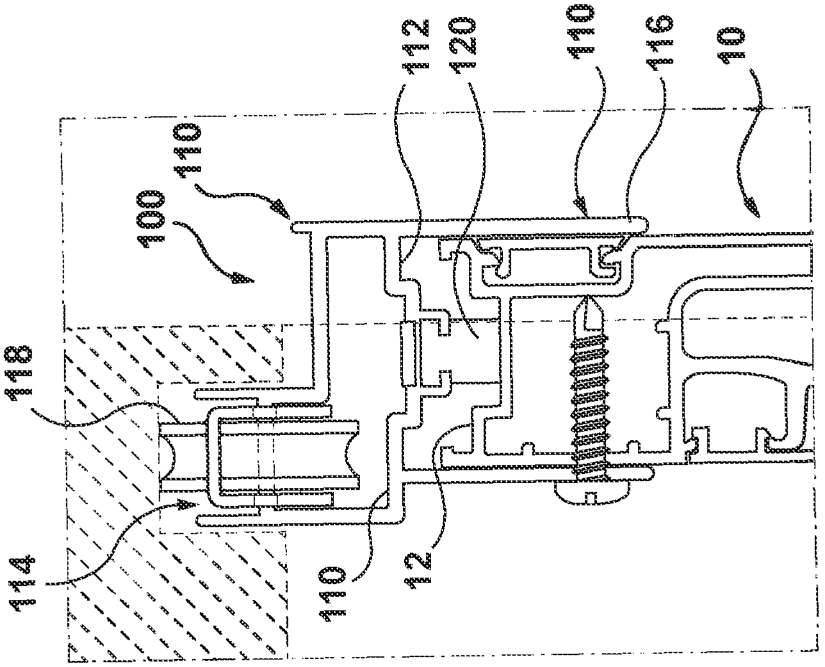
FIG. 2B illustrates a cross-sectional view of the upper member of FIG. 2A, according to an embodiment.
Figure 2A:
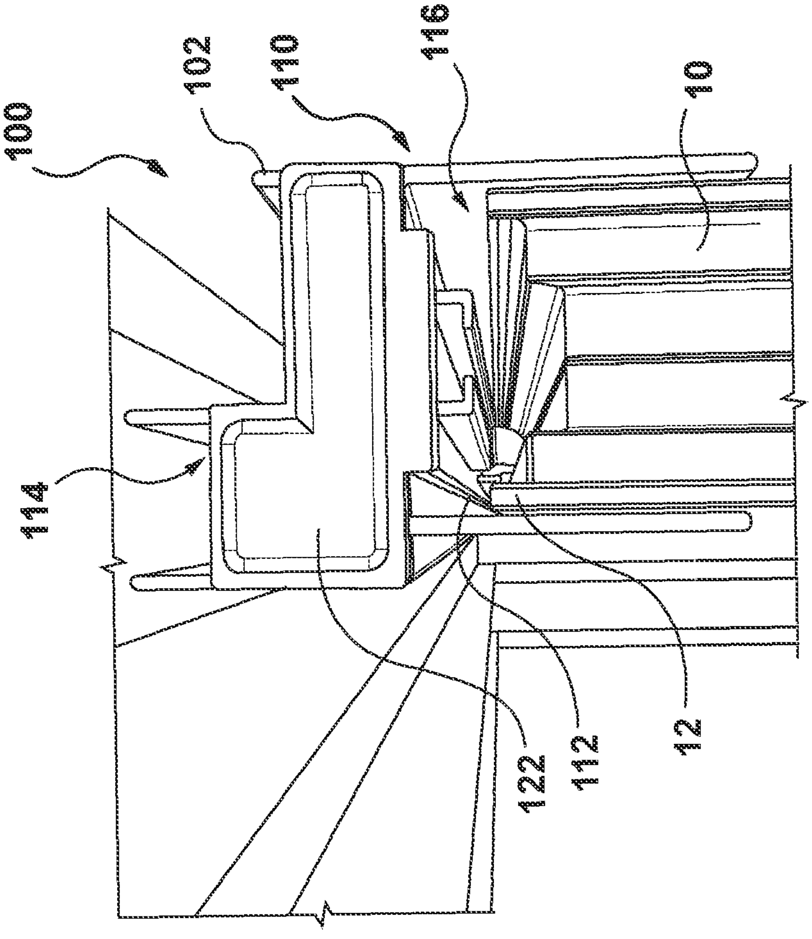
FIG. 2A illustrates a perspective cutaway view of an upper member encasing an edge portion of a sliding panel, according to an embodiment.
Figure 3B:
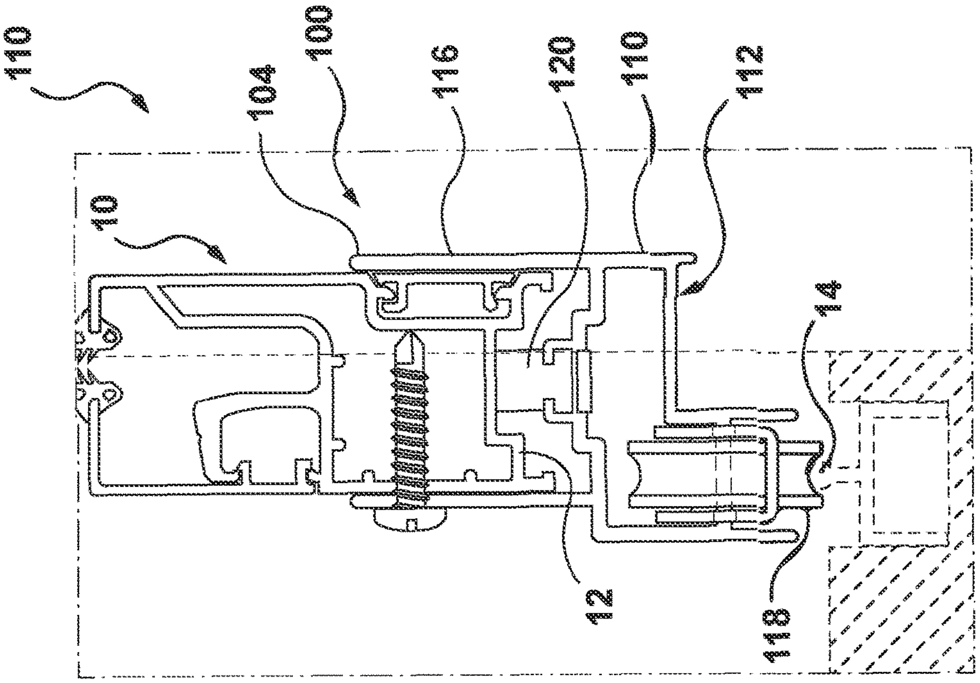
FIG. 3B illustrates a cross-sectional view of the lower member of FIG. 3A, according to an embodiment.
Figure 3A:
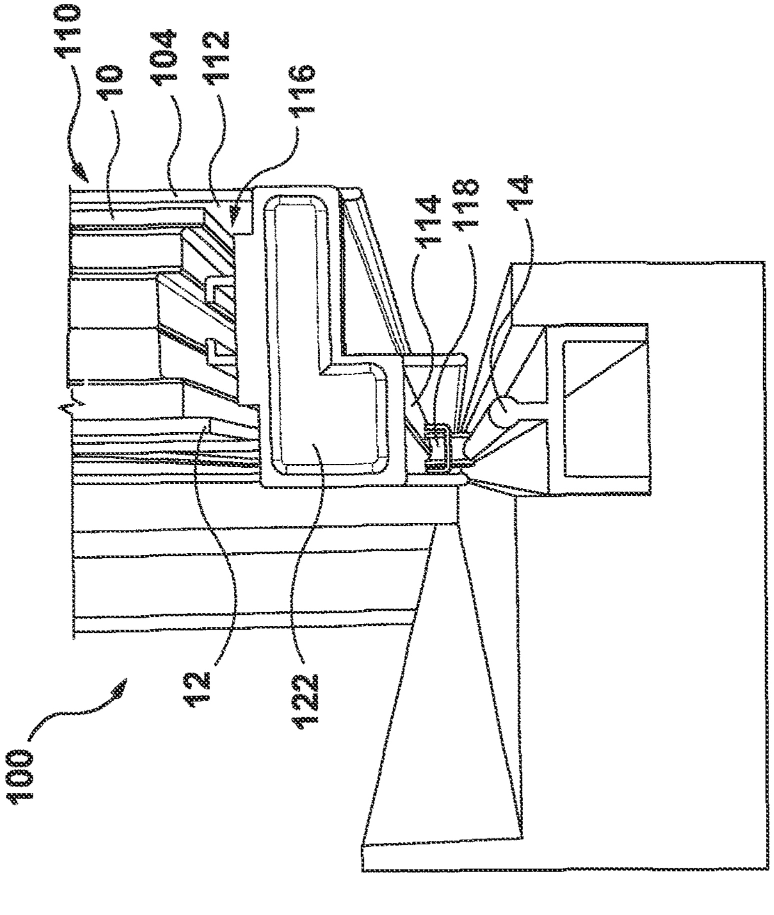
FIG. 3A illustrates a perspective cutaway view of a lower member encasing an edge portion of a sliding panel, according to an embodiment.
Figure 4C:
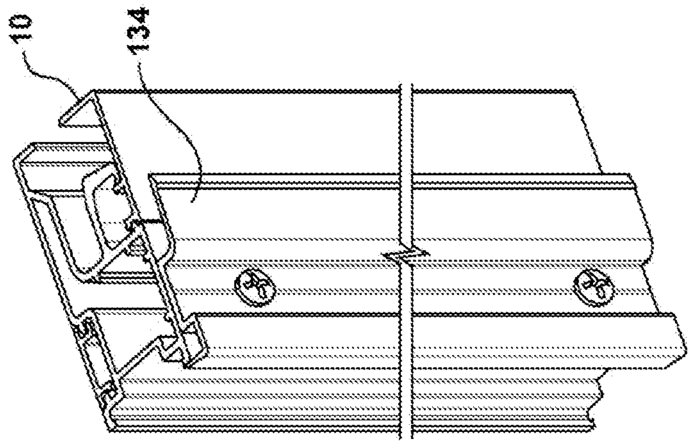
FIG. 4C illustrates a perspective view of a fixed interlock of the interlock assembly of FIG. 4A affixed to a sliding panel, according to an embodiment.
Figure 4D:
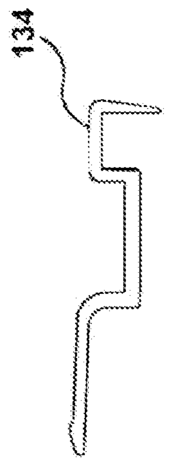
FIG. 4D illustrates a top plan view of the fixed interlock of FIG. 4C, according to an embodiment.
Figure 4A:
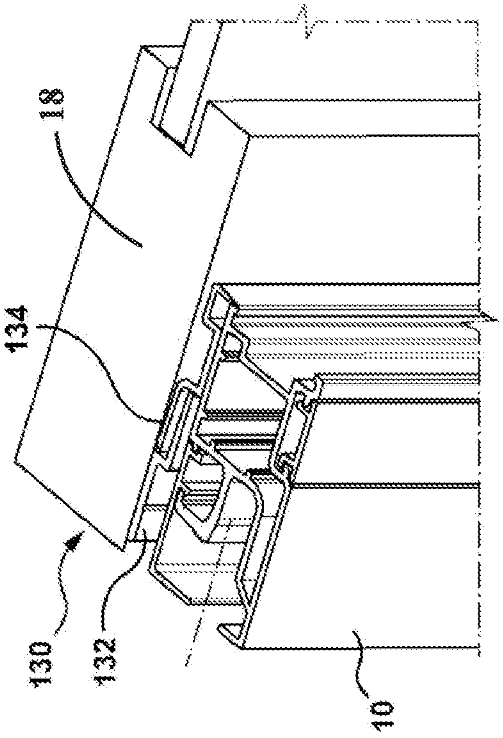
FIG. 4A illustrates a perspective view of an interlock assembly engaged, according to an embodiment.
Figure 4B:
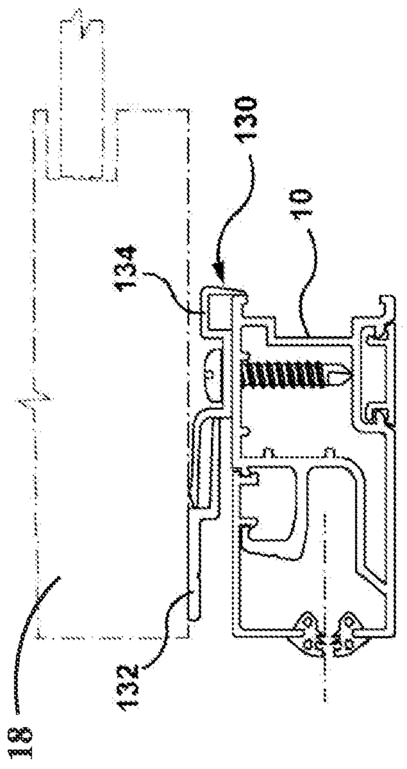
FIG. 4B illustrates a cross-sectional view of the interlock assembly of FIG. 4A, according to an embodiment.

The generally U-shaped channel 116 running along the inner side 112 of the housing 110 is guided over the sliding panel 10 and may be secured to the sliding panel 10 by a fastener such as a threaded screw as shown, for example, in FIGS. 2B and 3B. Although only one screw is shown, in actuality, a number of fasteners of various sizes would be used as will be known to one with skill in the art.

To engage an existing track 14, rollers 118 may extend from the outer side 114 as shown, for example, in FIGS. 2B-3B. The roller 118 may be a wheel having a channeled surface for engaging a protrusion forming a track 14 as shown in the accompanying drawings. Alternatively, the roller may be configured differently, such as having multiple channeled surfaces to align with and engage multiple protrusions of a track. Any suitable number and configuration of rollers can be used as will be known to one with skill in the art. Typically, at least two spaced apart rollers would be used for stability. Thus, there may be at least two top rollers 118 and at least two bottom rollers 118. Additionally, alternative roller options are available such as adjustable rollers, fixed rollers, or larger rollers that can offer improved security. Particular embodiments of these may be used and described further below.

To provide for adjustability within the mounting apparatus 100, springs may be provided, such as flat springs 120 between the sliding panel 10 and the inner side 112 of the U-shaped channel 116. During installation, this is helpful to guide the sliding panel 10 mounted with the mounting apparatus 100 onto tracks 14. For example, as described below, in use, the sliding panel 10 mounted with the mounting apparatus 100 is inserted onto existing upper and lower tracks 14. Therefore, after the sliding panel 10 is guided onto one set of tracks 14, the flat springs 120 permit for adjustability or compression of the mounting apparatus 100 in combination with the sliding panel 10 to allow it to be inserted onto opposing tracks 14 before eventually releasing. The flat springs 120, therefore, permit sufficient clearance for guiding and installing the sliding panel 10 into the frame 16. Thus, the distance between the mounting apparatus 100 and the sliding panel 10 may be adjustable. In embodiments with the sash assembly 24 described above, the distance between the mounting apparatus 100 and the top sash 26 may be adjustable and the distance between the mounting apparatus 100 and the bottom sash 28 may be adjustable. In some embodiments, the housing 110 may be fixed with no further adjustable U-channel as shown in, for example, FIGS. 11A-12E.

As another method for facilitating installation of the sliding panel 10 within the frame 16 that may be used in addition to or in place of the spring 120, adjustable rollers 218 may be provided as shown in the accompanying figures. As mentioned above, there may be at least two top rollers 218 and at least two bottom rollers 218. The top rollers 218 extend away from the outer side of the top sash 26 and are configured to engage with the top track 14 of the frame 16. Similarly, the bottom rollers 218 extend away from the outer side of the bottom sash 28 and are configured to engage with the bottom track 14 of the frame 16. The rollers 218 may each be individually adjustable and may be pivotably coupled to the sliding panel 10, to the sash assembly 24, or to the housing 110.

Figure 9A:
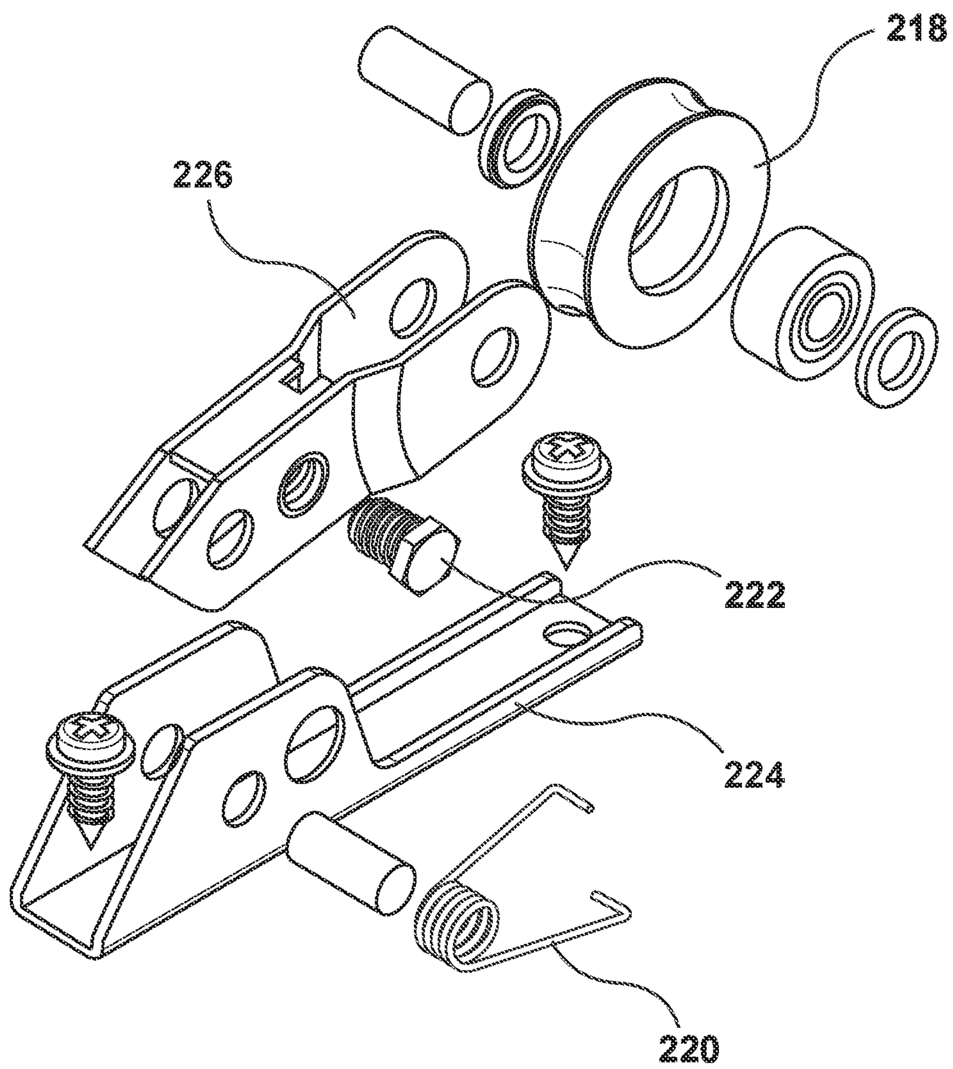
FIG. 9A illustrates an exploded perspective view of the adjustable roller of FIG. 7, according to an embodiment.
Figure 9B:
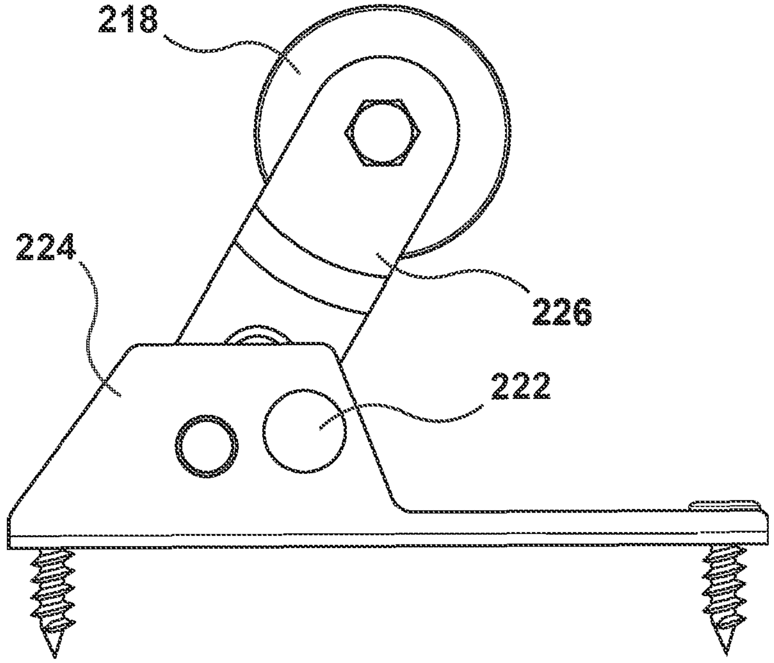
FIG. 9B illustrates a side elevation view of the adjustable roller of FIG. 7 in its normal extended position, according to an embodiment.
Figure 9C:
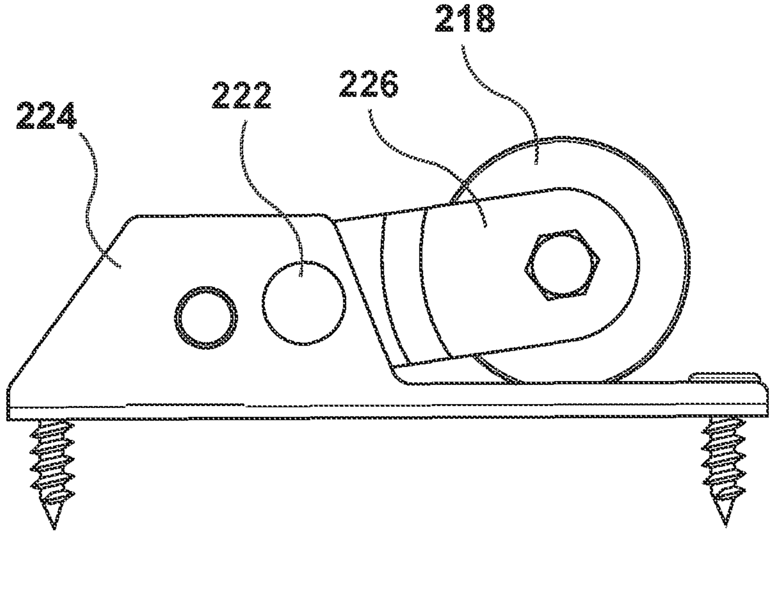
FIG. 9C illustrates a side elevation view of the adjustable roller of FIG. 7 in its compressed retracted position, according to an embodiment.
Figure 9D:
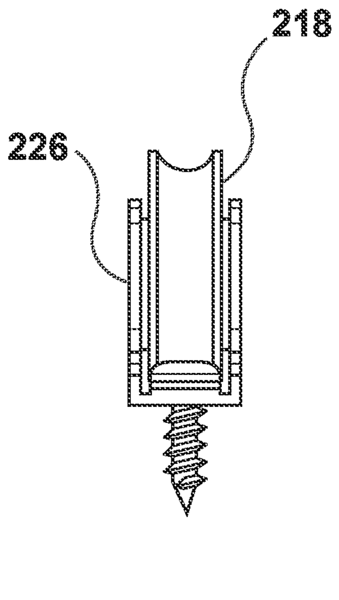
FIG. 9D illustrates a front elevation view of the adjustable roller of FIG. 7 in its compressed retracted position, according to an embodiment.
Figure 10:
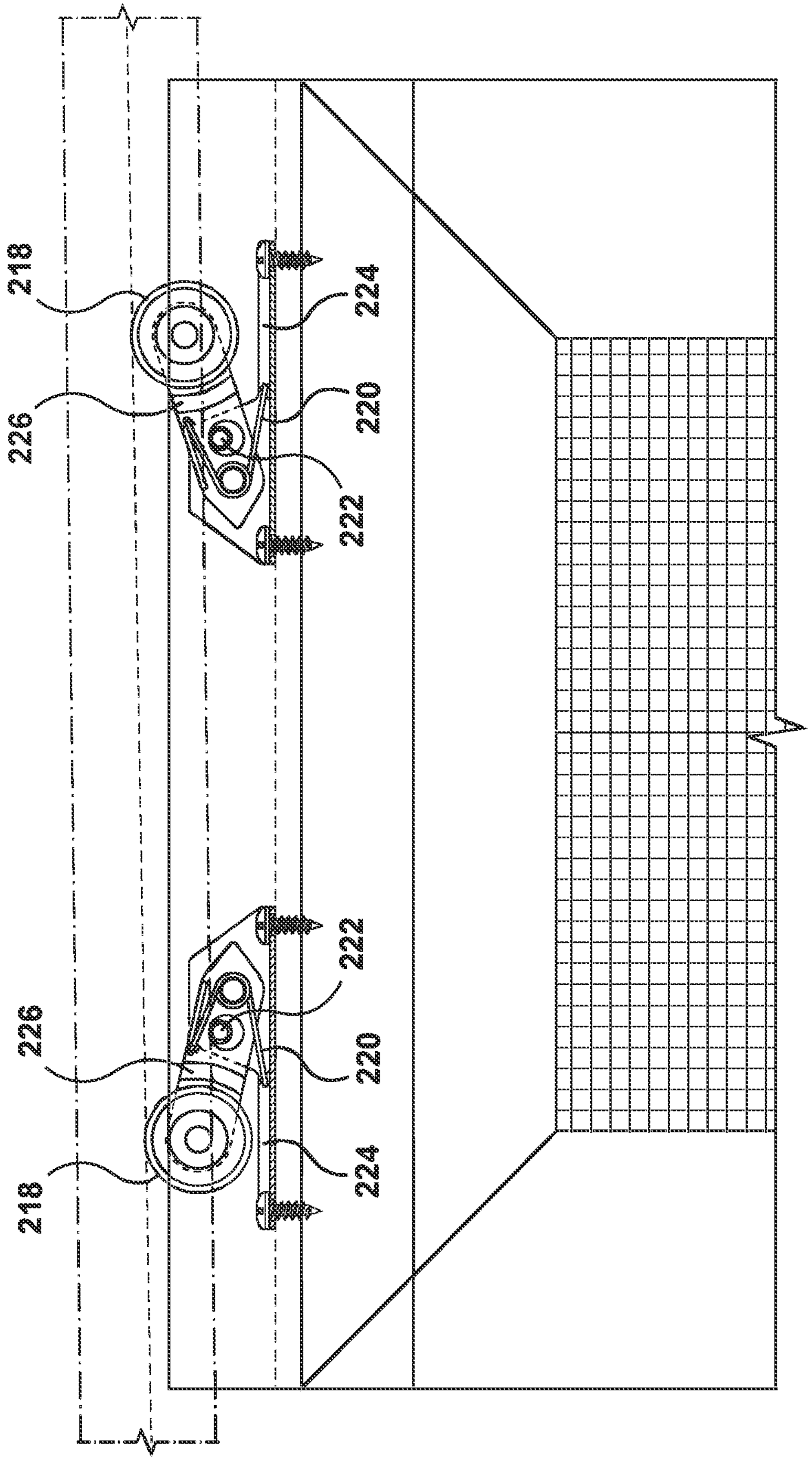
FIG. 10 illustrates a cross-sectional view of a mounting apparatus having adjustable rollers in use being guided along an unlevel frame, according to an embodiment.
Figure 11A:
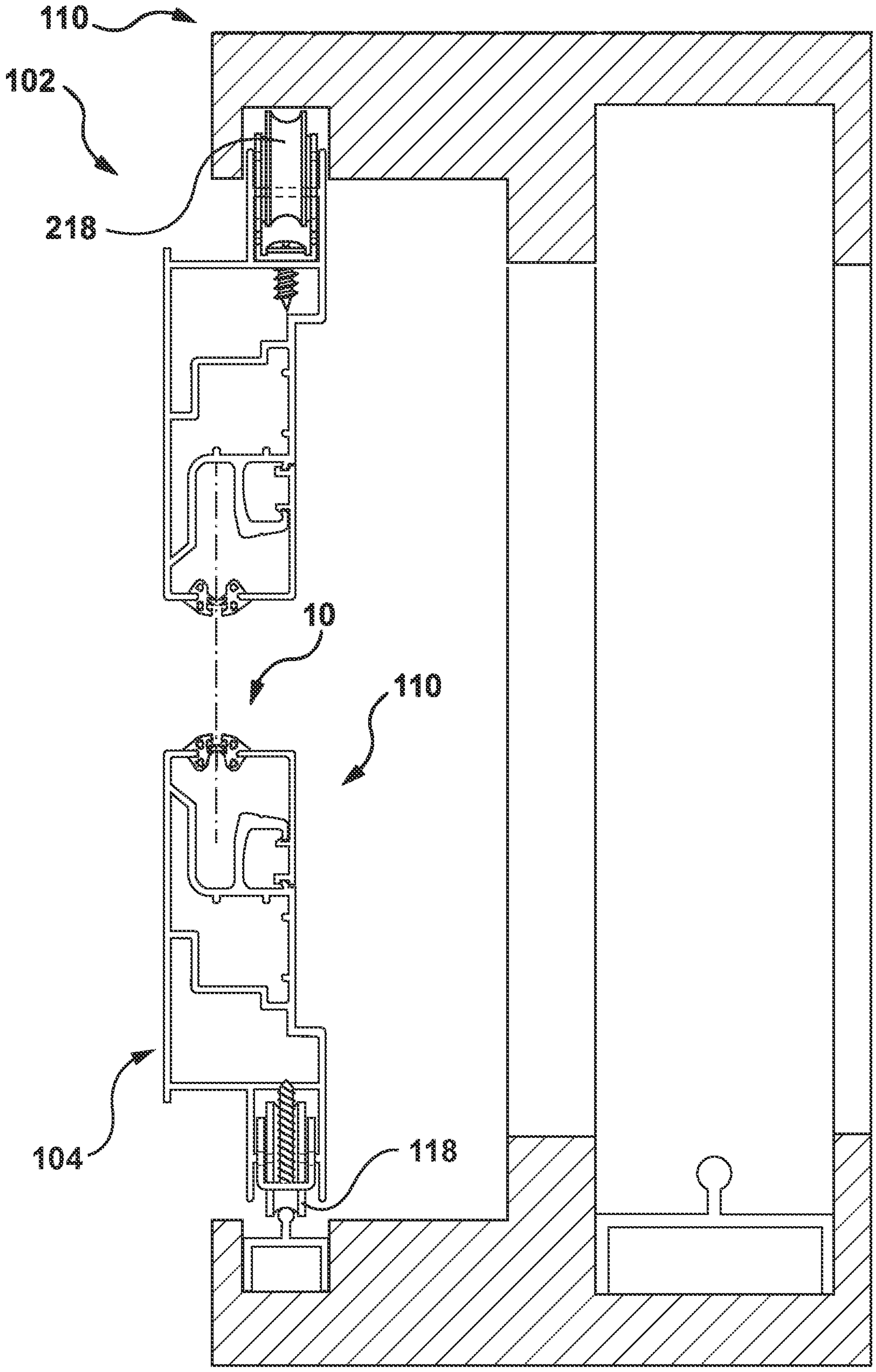
FIG. 11A illustrates a cross-sectional view of a mounting apparatus having upper and lower members installed on an upper and lower edge of a sliding panel with adjustable rollers and a non-adjustable housing, according to an embodiment.
Figure 11B:
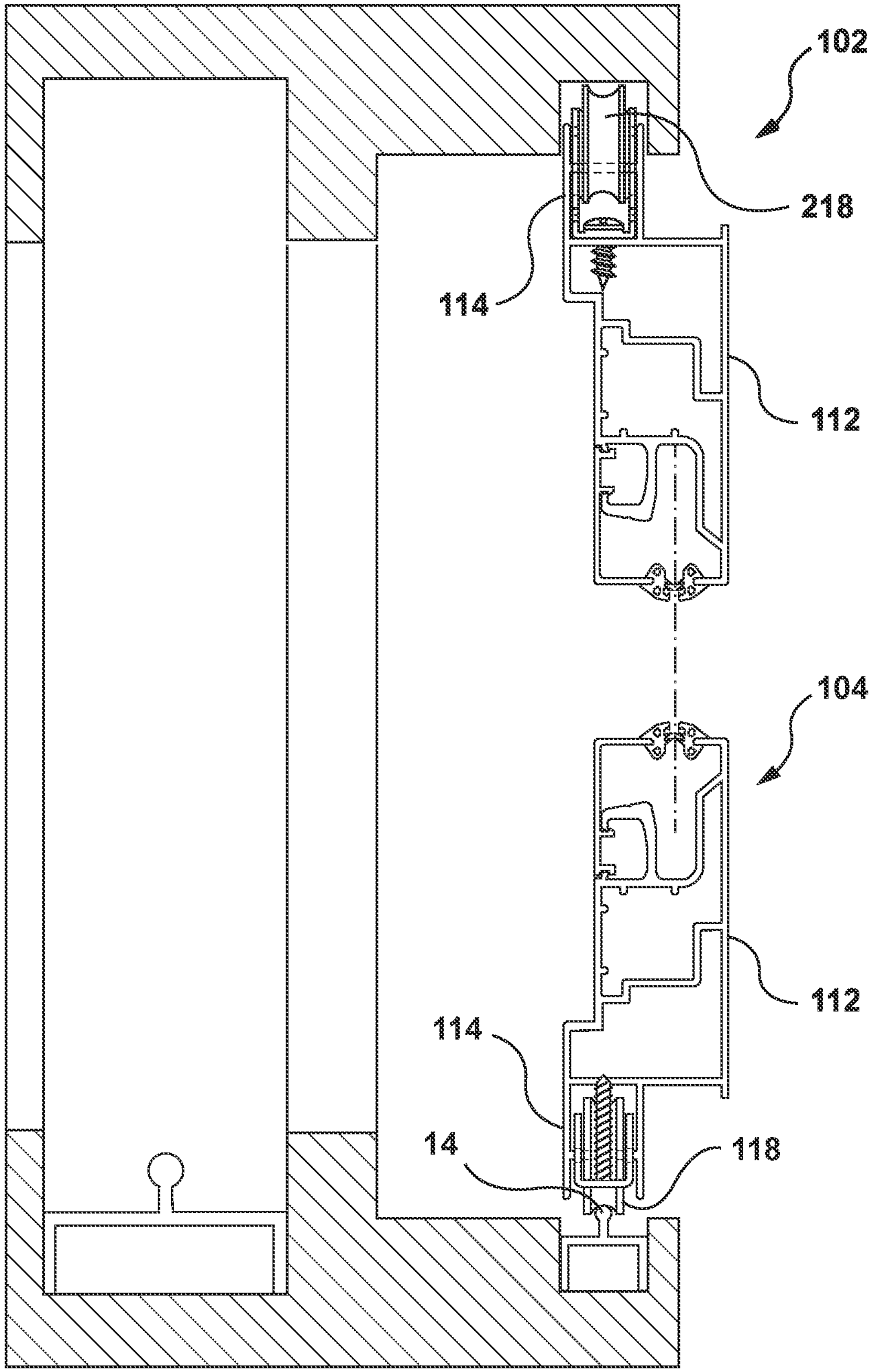
FIG. 11B illustrates a cross-sectional view of a mounting apparatus having upper and lower members installed on an upper and lower edge of a sliding panel with adjustable rollers and a non-adjustable housing, according to an embodiment.
Figure 12A:
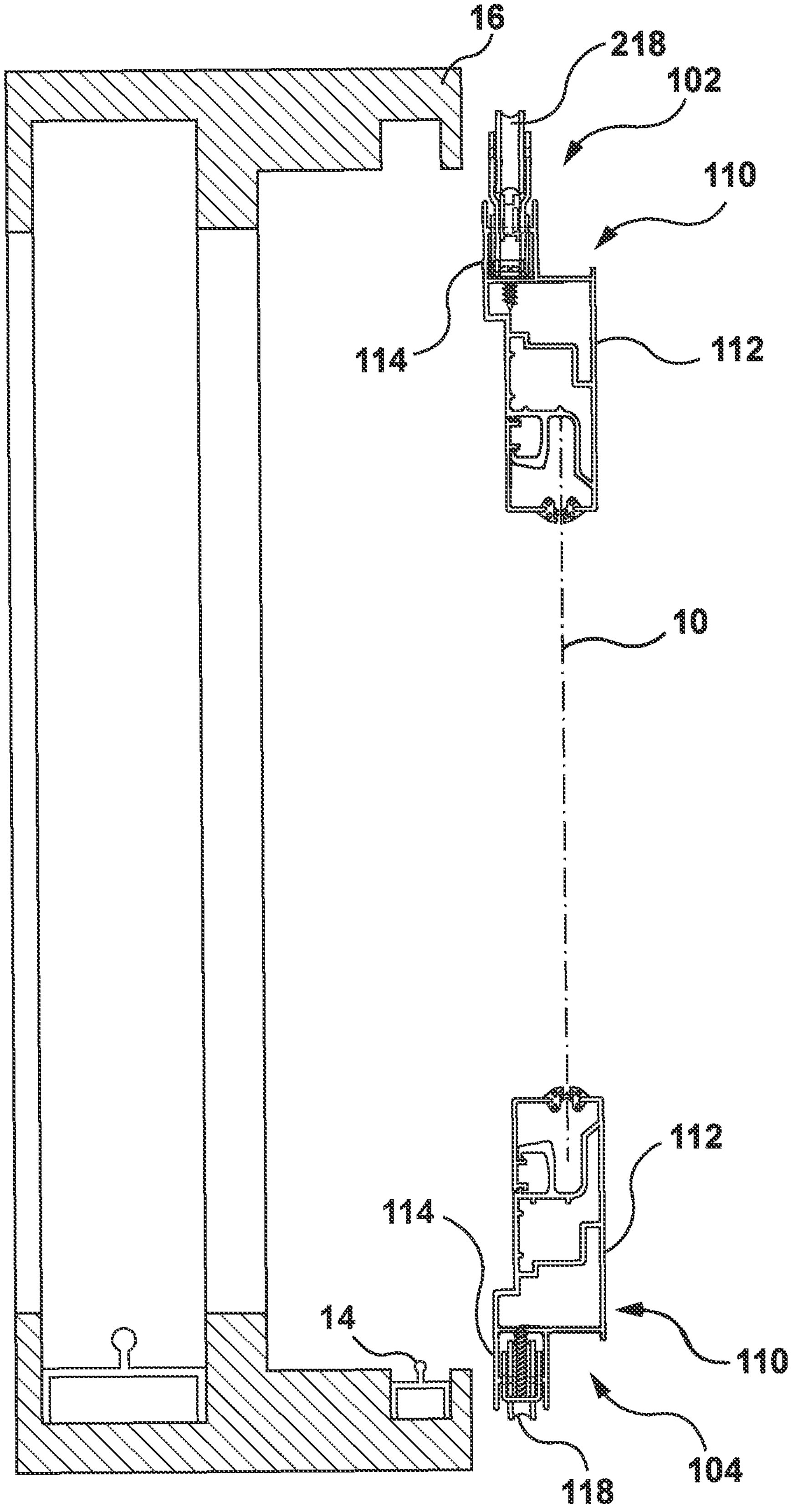
FIG. 12A illustrates a sliding panel having mounted thereon the mounting apparatus of FIG. 11B, the sliding panel being prepared for insertion by aligning the upper and lower members of the apparatus with the frame, according to an embodiment.
Figure 12B:
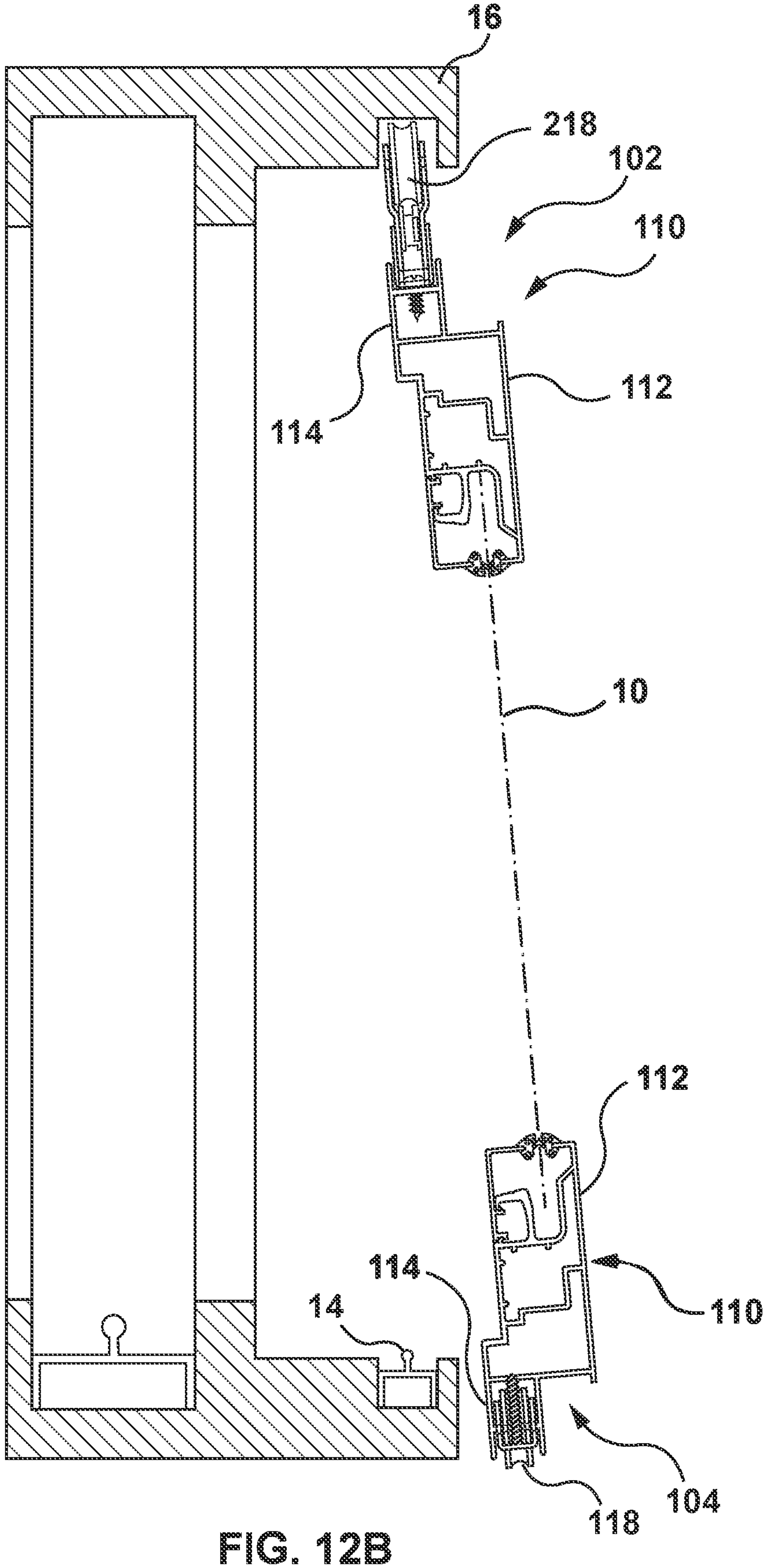
FIG. 12B illustrates the sliding panel of FIG. 11B being tilted to insert into the upper portion of the frame, according to an embodiment.
Figure 12C:
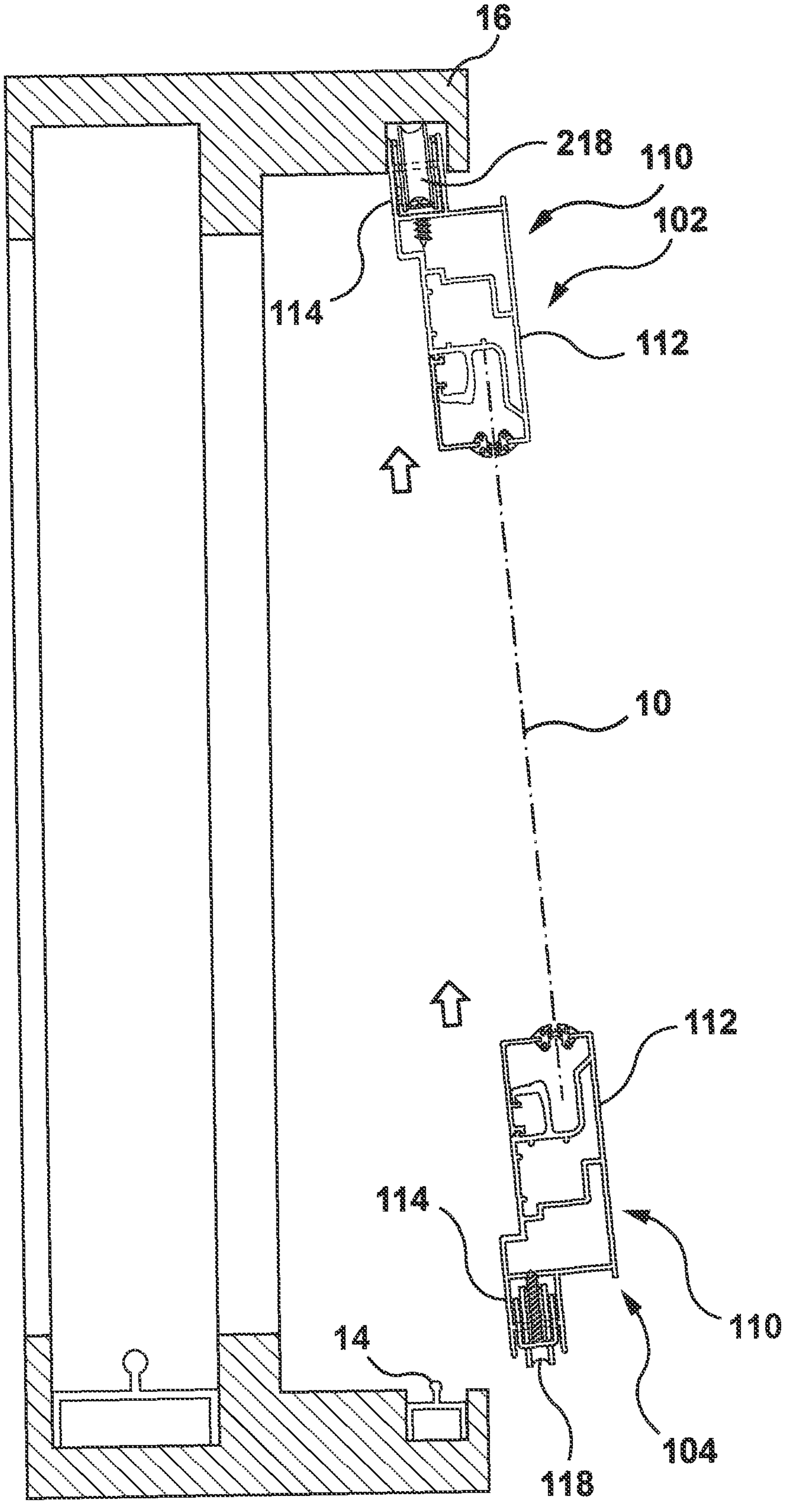
FIG. 12C illustrates the sliding panel of FIG. 11B being lifted from the lower edge and compressing the upper adjustable rollers into a retracted position to allow insertion of the entire sliding panel into the frame, according to an embodiment.
Figure 12D:
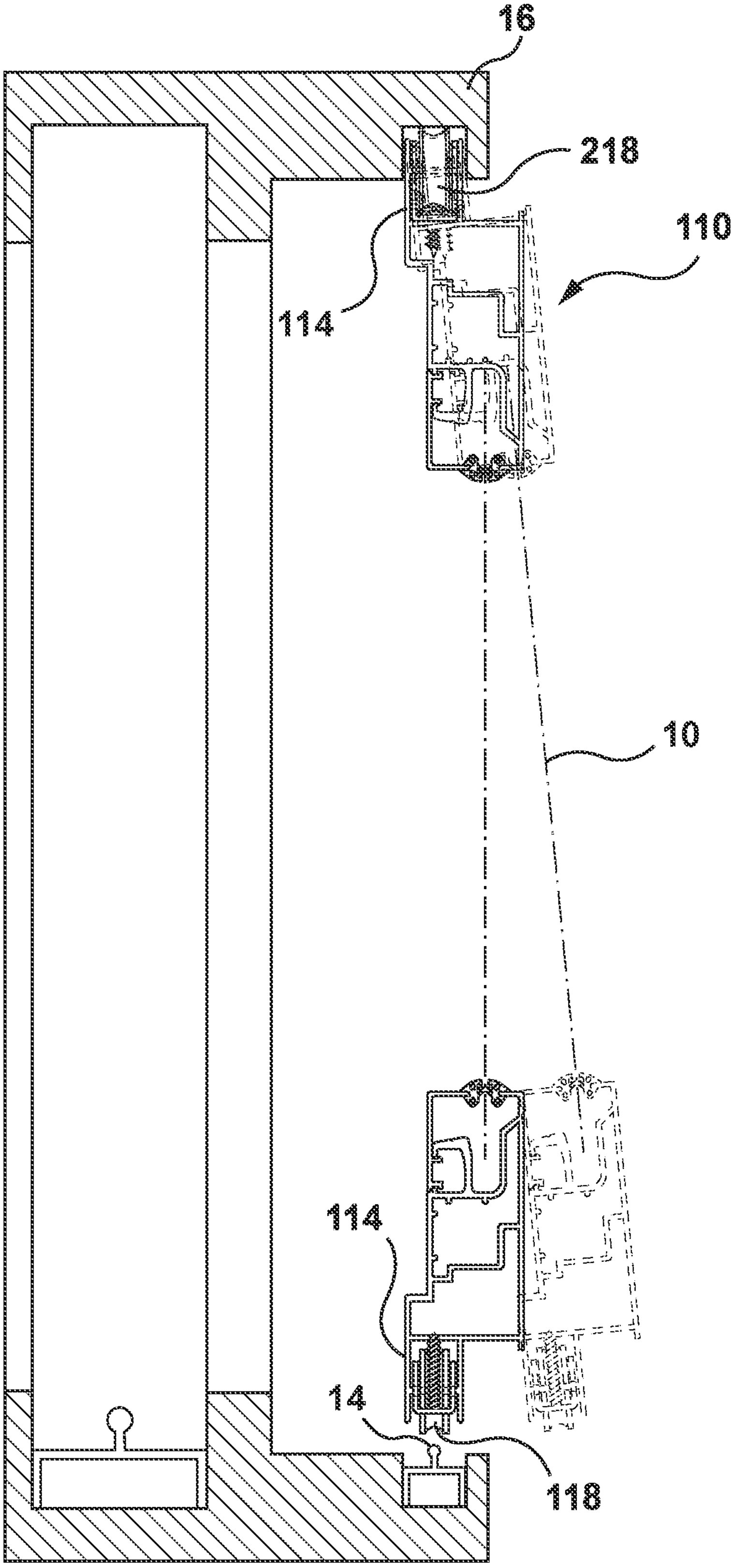
FIG. 12D illustrates the sliding panel of FIG. 11B being rotated into a straightened vertical position to insert the sliding panel into the frame, according to an embodiment.
Figure 12E:
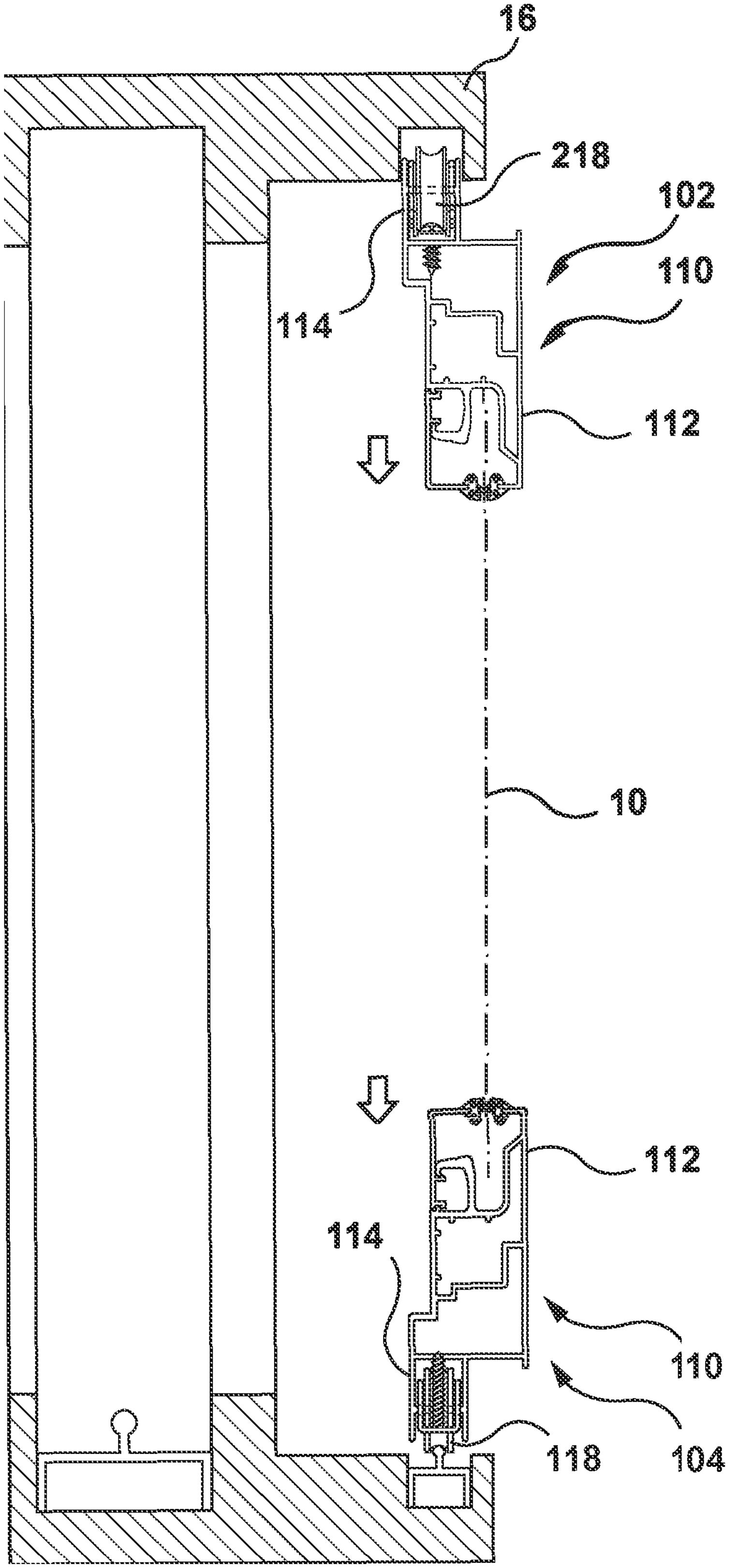
FIG. 12E illustrates the sliding panel of FIG. 11B being released to move the upper adjustable rollers into their normal extended position and releasing the lower edge of the sliding panel down to engage the lower portion of the frame.

The rollers 218 may be adjustable in addition to an adjustable U-channel housing as shown, for example, in FIGS. 7-10, or may be adjustable in lieu of the adjustable U-channel housing as shown, for example, in FIGS. 11-12E. For example, the adjustable rollers 218 may include a return spring 220 so that the adjustable rollers 218 remain in an expanded position and retract as guided by the frame and/or tracks. This adjustability can be useful during insertion of the sliding panel 10 into the frame 16 as well as to permit continuous rolling in case the frame 16 is not level. The lower rollers 218 engaging the lower portion of the frame 16 may be adjustable while the upper rollers 218 engaging the upper portion of the frame 16 (or track 14) may be fixed. Alternatively, the upper rollers 218 may be adjustable while the lower rollers 218 may be fixed. In other embodiments, the upper and lower rollers may be adjustable or other combinations of adjustability as will be known to one with skill in the art.

In some embodiments of the adjustable roller 218, such as the embodiment shown in FIGS. 9A-10, a base 224 having a generally U-shaped cradle is provided that can be secured to the sliding panel 10, to the sash assembly 24, or to the housing 110, by a fastener or screws or as will be known to one with skill in the art. A pivot arm 226 is retained to the generally U-shaped base 224 at one end to permit the pivot arm 226 to rotate within the base 224 to an extended or retracted position. Adjustable rollers 218 are mounted at another end of the pivot arm 226. The return spring 220 may be added by being secured, for example, to a retaining ring extending through aligned slots in the U-shaped cradle of the base 224 and the one end of the pivot arm 226. Therefore, when the pivot arm 226, normally in an extended position, is compressed into a retracted position, the pivot arm 226 is biased toward the extended position to maintain rolling within the frame 16, as shown, for example, in FIG. 10. This adjustability or extension/retraction is also useful during installation of the sliding panel 10 into the frame 16 as shown, for example, in FIGS. 8A-8E.

Figure 14A:
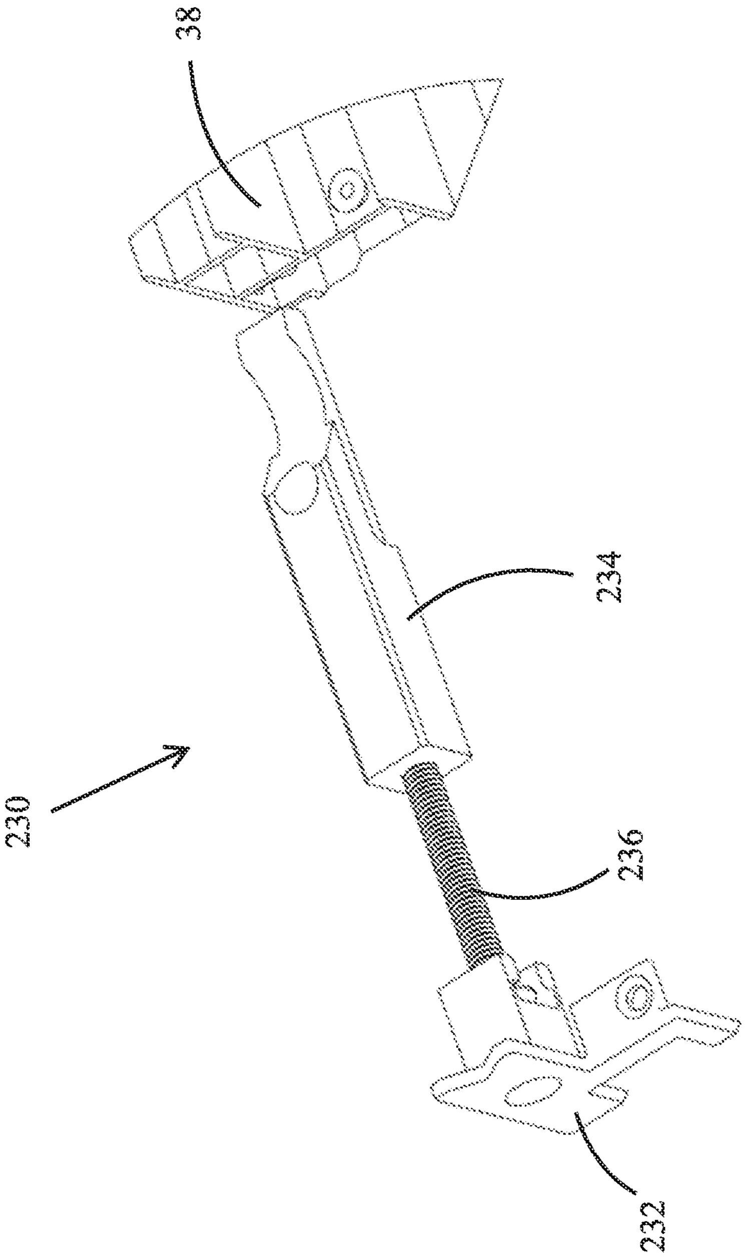
FIG. 14A illustrates the adjustment assembly for the rollers exploded from the end of the bottom sash.
Figure 14B:
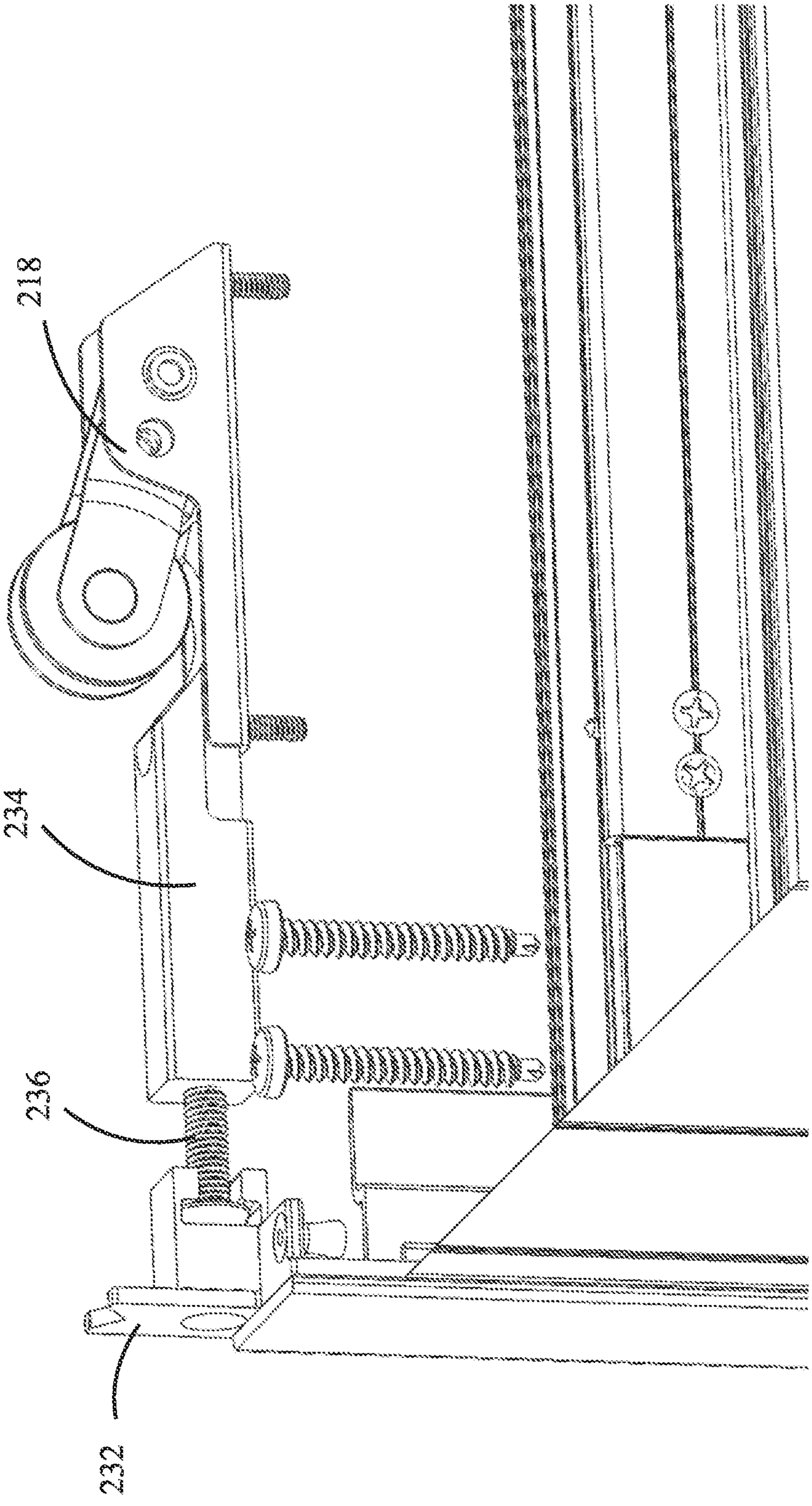
FIG. 14B illustrates the adjustment assembly for the rollers with the roller adjusted toward the sliding panel.
Figure 14C:
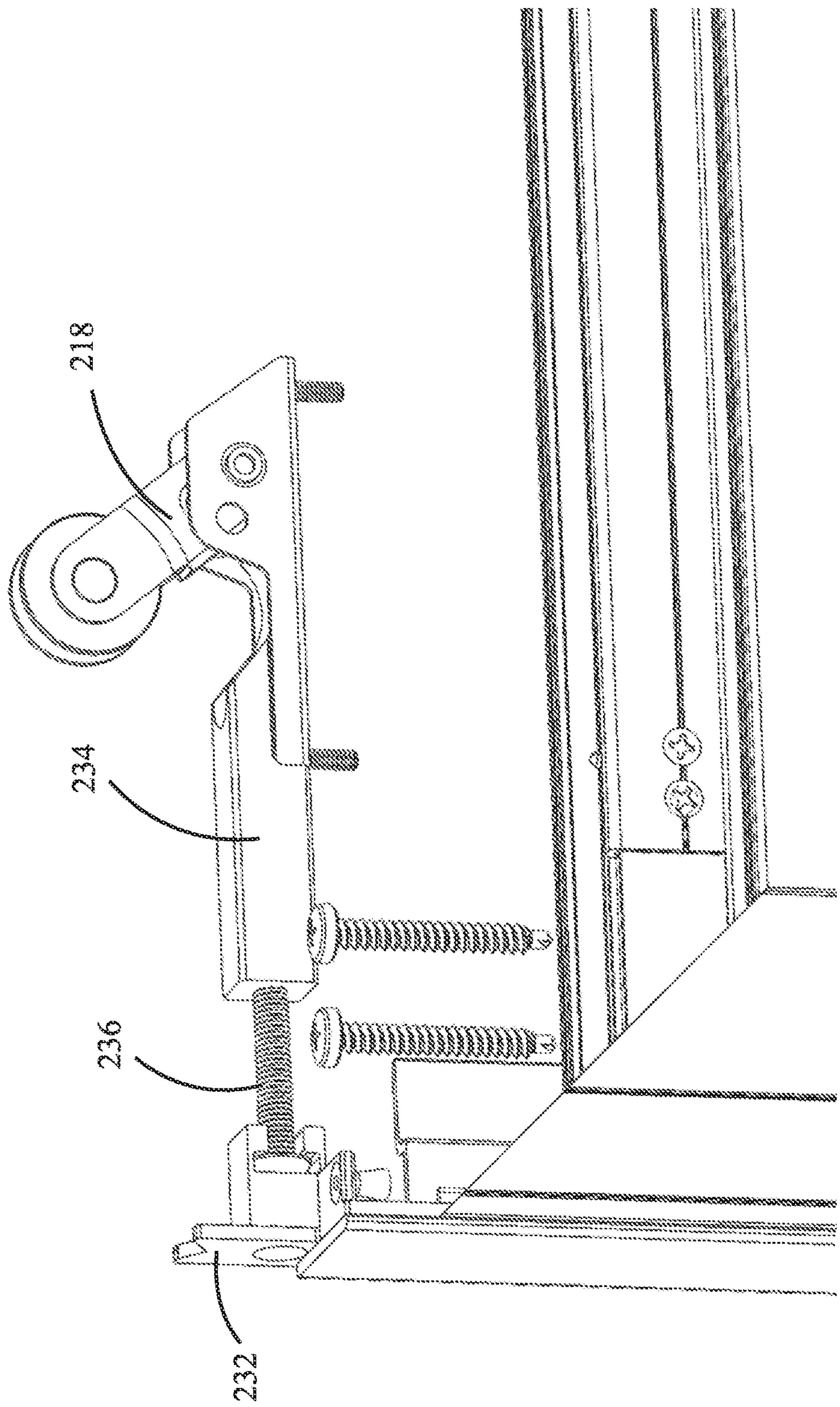
FIG. 14C illustrates the adjustment assembly for the rollers with the roller adjusted away from the sliding panel.
Figure 15:
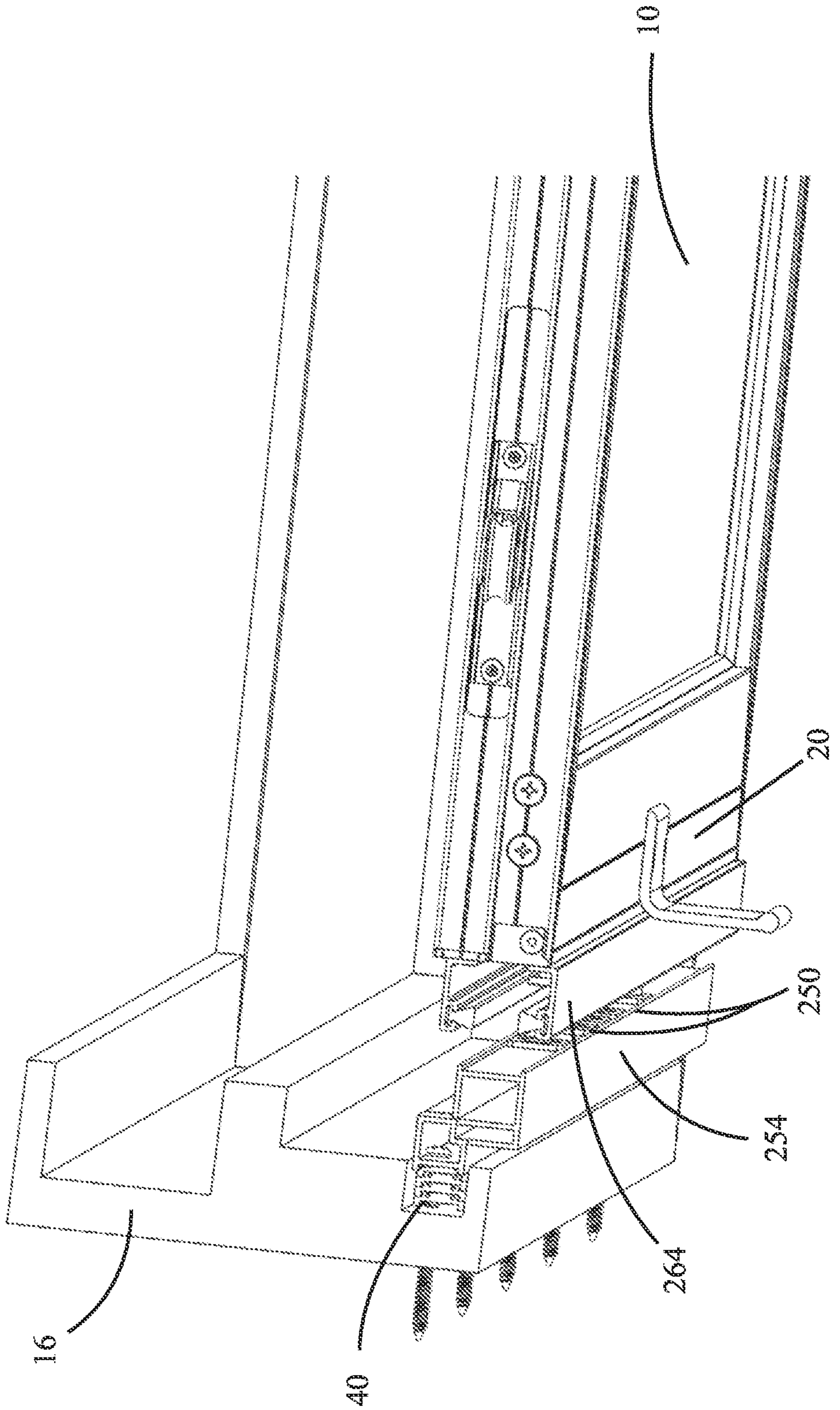
FIG. 15 illustrates a top perspective view of the sliding panel in a nearly closed position.
Figure 16:
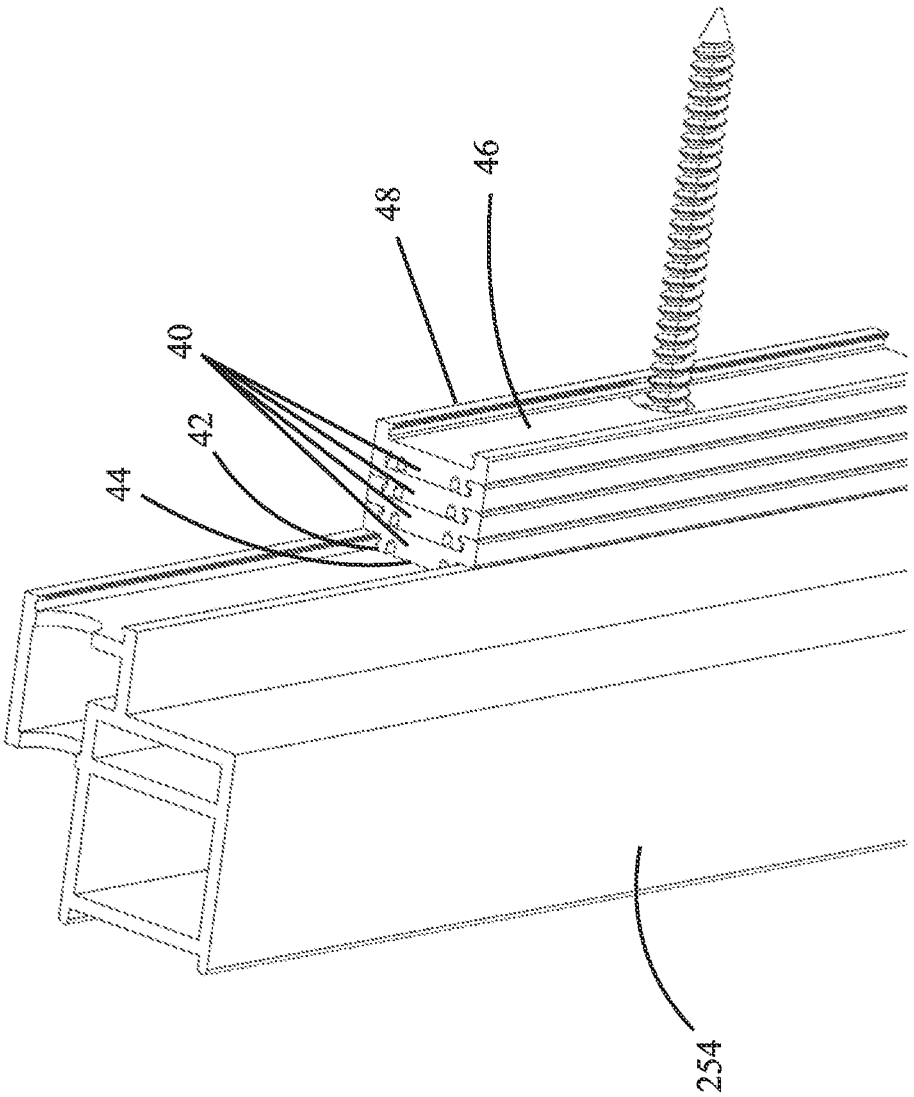
FIG. 16 illustrates a top perspective view of the latch channel with a plurality of shims.

As mentioned above, the rollers 218 may be adjustable and may be biased away from the sliding panel 10. However, it is desirable to secure the sliding panel 10 within the frame 16 once the sliding panel 10 has been installed. Because the adjustability of the rollers 218 would allow an intruder to easily remove the sliding panel 10 from the frame 16, the security sliding barrier 200 may be configured to fix the rollers 218 in place once the sliding panel 10 has been installed. For example, as shown in FIGS. 14A-14C, the security sliding barrier 200 may have a plurality of adjustment assemblies 230. Each adjustable roller 218 may have a corresponding adjustment assembly 230. The adjustment assembly 230 may comprise an end cap 232, an adjustment block 234, and an adjustment screw 236. The end cap 232 may be positioned on a corner of the sliding panel 10. For example, the end cap 232 may be positioned on an end 38 of the bottom sash 28 or may be positioned on an end of the housing 110 of the mounting apparatus 100. This may improve the cosmetic appearance of the housing 110 and limit the entry of dust or other debris into outer side 114 of the mounting apparatus 100, which may also help keep the rollers 118 clean to maintain the rolling of the sliding panels 10 on the tracks 14.

The adjustment block 234 is positioned adjacent to the roller 218 and is configured to create a limit on the rotation of the roller 218 towards the sliding panel 10 by pushing against the pivot arm 226. When the adjustment block 234 is positioned closer to the roller 218, the adjustment block 234 prevents more rotation of the pivot arm 226 and thus maintains the roller 218 at a further distance away from the sliding panel 10 (FIG. 14B). Conversely, when the adjustment block 234 is positioned further away from the roller 218, the pivot arm 226 is able to rotate over a greater arc before contacting the adjustment block 234, and the roller 218 is freer to move toward and away from the sliding panel 10 (FIG. 14C). Thus, once the sliding panel 10 is installed within the frame 16, the adjustment block 234 can be tightened up against the pivot arm 226 to lock the pivot arm 226 in place, with the adjustment block 234 preventing the pivot arm 226 from rotating closer toward the sliding panel 10 and the track 14 preventing the pivot arm 226 from rotating further away from the sliding panel 10. Thus, the adjustability of the roller 218 can be locked so that the sliding panel 10 cannot simply be removed from the frame 16.

The adjustment screw 236 is configured to provide the user with a way to adjust the position of the adjustment block 234. The adjustment screw 236 may be rotatably coupled to the end cap 232 and may be accessible through the end cap 232. Additionally, the adjustment screw 236 may be threadedly coupled to the adjustment block 234. Thus, when the adjustment screw 236 is rotated in a first direction, the adjustment block 234 is moved toward the roller 218 and the roller 218 is pivoted away from the sliding panel 10 and when the adjustment screw 236 is rotated in a second direction opposite the first direction, the adjustment block 234 is moved away from the roller 218 and the roller 218 is pivoted toward the sliding panel 10.

The adjustability of the rollers 218 may also be useful in leveling the sliding security barrier 200, in particular over time. For example, when the sliding security barrier 200 is first installed, it can be leveled by adjusting the rollers 218. Over time, however, houses shift, and this can cause the sliding security barrier 200 to be unlevel. Because the rollers 218 are easily adjustable, this can be fixed without much effort.

As another method of limiting removal of the sliding panel 10 to improve security, a locking screw 222 may be added to the adjustable rollers (FIG. 9B-9C). In use, the adjustable rollers vertically adjust as shown, for example, in FIGS. 8A-8E for installation, and may then be locked in place with the insertion of the locking screw 222 in a corresponding hole (as shown in, for example, FIGS. 9A-10). Thus, when the adjustable roller is in its desired position, the locking screw 222 may be inserted to secure that position to limit further vertical movement and limit lifting of the sliding panel 10 from the frame 16. In one embodiment, the locking screw 222 may be sized smaller than the corresponding hole to permit limited vertical movement or adjustability within the frame, for example, for a frame 16 that is not level as shown in FIG. 10 without permitting the full range of movement that would otherwise be available without the locking screw 222, and thereby continuing to offer increased security.

In some embodiments, an end cap 122 may be added to cover the outer side 114 of the housing 110 that is not linked to the adjustment assembly 230. As mentioned above, even with the benefit of adjustment of the rollers 218, the end cap 122 can improve the cosmetic appearance of the housing 114 and limit the entry of dust or other debris into outer side 114 of the mounting apparatus 100. Limiting the entry of dust and debris into the outer side 114 of the housing 110 can also help keep the rollers 118 clean to maintain the rolling of the sliding panels 10 on the tracks 14 as will be known to one with skill in the art.

Although the housing 110 is shown to have an internal profile with various grooves and extensions, the internal profile can have various other features to generally complement the external profile of a sliding door as will be known to one with skill in the art.

In another embodiment, as shown in FIGS. 4A-4D, the mounting apparatus 100 has an interlock assembly 130 having a fixed interlock 132 configured to attach to the fixed panel 18 or to the frame 16 and a sliding interlock 134 configured to attach to the second side sash 32 or to the second side 22 of the sliding panel 10. When the security sliding barrier 220 is in the closed position, the sliding interlock 134 is configured to engage with the fixed interlock 132 to lock the second side sash 32 or the second side 22 of the sliding panel 10 to the fixed panel 18.

The fixed interlock 132 and the sliding interlock 134 may be secured to their respective surfaces with fasteners such as screws. These screws may be spaced apart along the fixed interlock 132 and the sliding interlock 134 as will be known to one with skill in the art. When engaged, the interlock assembly 130 limits lateral movement of the sliding panel 10 to restrict removal of the sliding panel 10 from the frame 16. An upper member 102 such as the top sash 26 and a lower member 104 such as the bottom sash 28 may be provided for the mounting apparatus 100, each engaging an upper and lower edge portion 12 of the sliding panel 10, respectively. Therefore, the interlock assembly 130 may extend between both the upper and lower members 102, 104. In some embodiments, the interlock assembly 130 extends from the upper member 102 to the lower member 104, while in other embodiments, the interlock assembly 130 comprises multiple assemblies 130 positioned along the second side 22 of the sliding panel 10, each configured to lock the sliding panel 10 to the fixed panel 18 when the sliding panel 10 is in the closed position. Although FIGS. 4A-4D illustrate a particular shaped interlock component, it will be clear to those of ordinary skill in the art that the specific shape of the interlock components may be modified for other embodiments provided they proved the interlocking function. By non-limiting example, an L-shaped interlock is also contemplated.

Figure 5B:
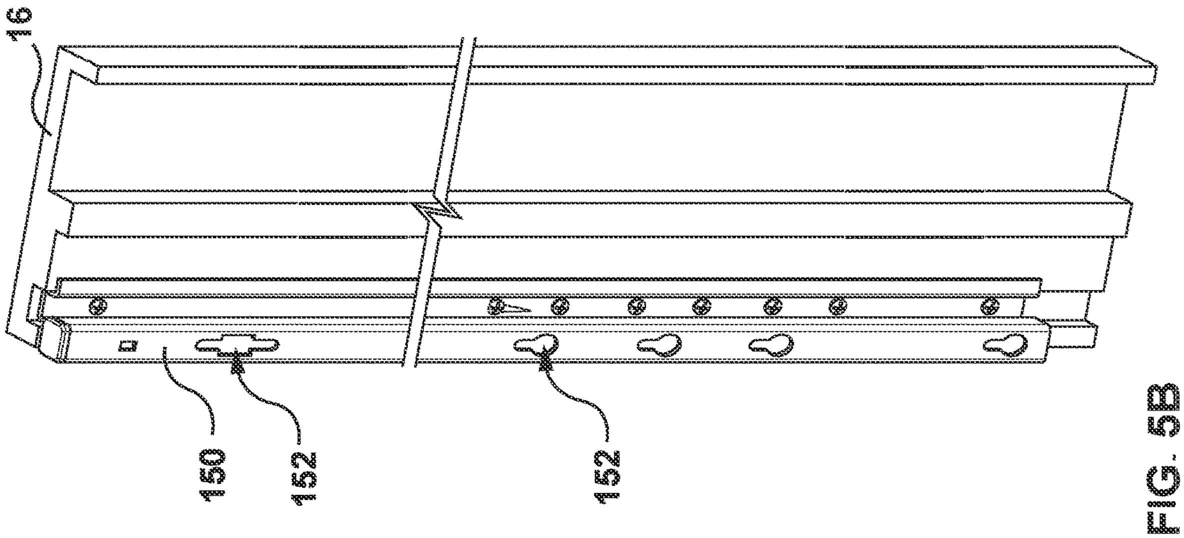
FIG. 5B illustrates an alternative perspective view of the strike plate of FIG. 5A, according to an embodiment.
Figure 5A:
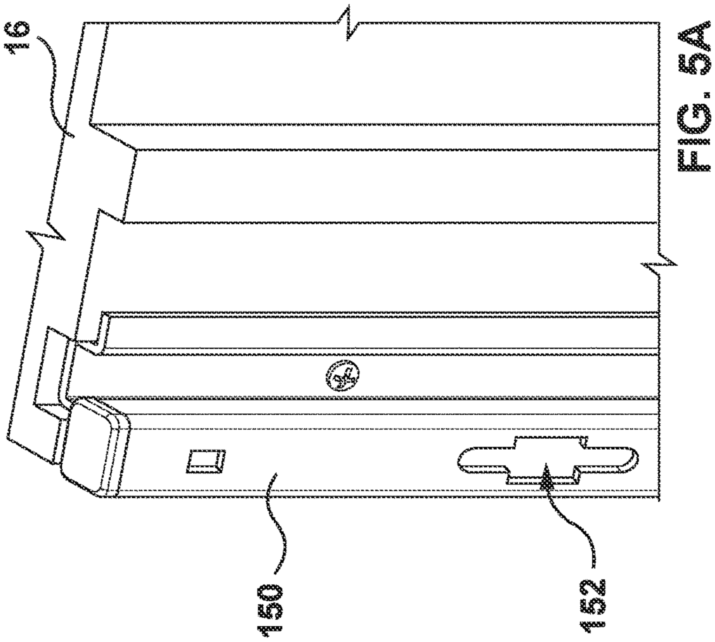
FIG. 5A illustrates a perspective view of a strike plate affixed to a door jamb, according to an embodiment.
Figure 5C:
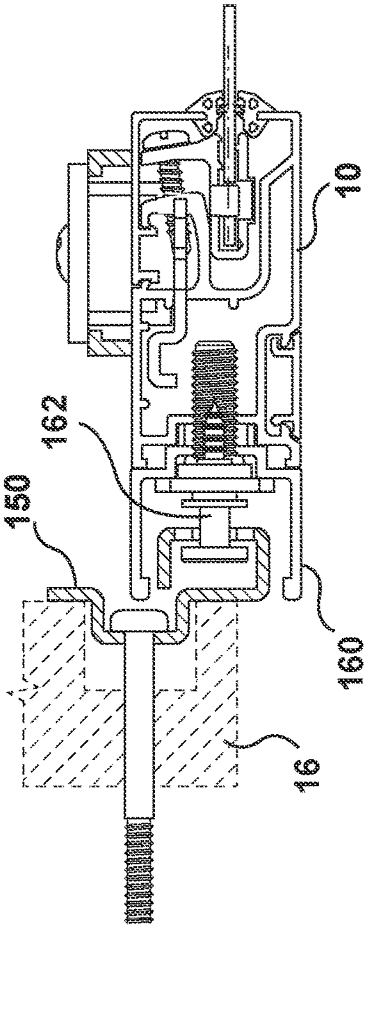
FIG. 5C illustrates a cross-sectional view of the strike plate of FIGS. 5A and 5B engaged with a locking apparatus, according to an embodiment.
Figure 5E:
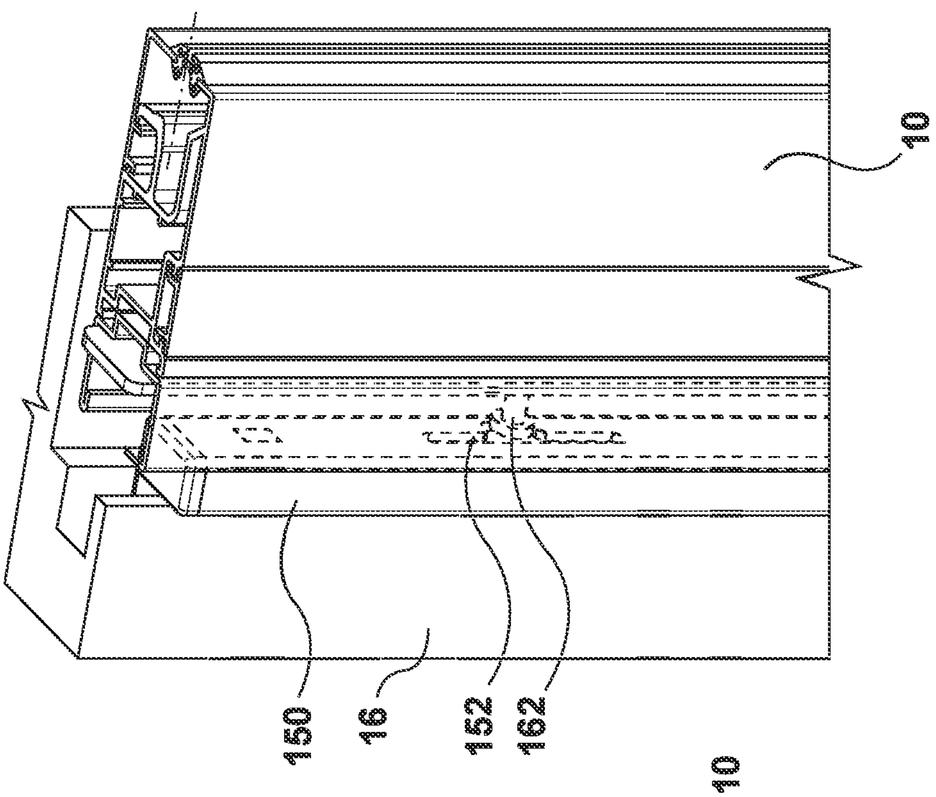
FIG. 5E illustrates another perspective view of FIG. 5D with the strike plate preparing to receive the locking apparatus, the locking apparatus is shown with transparent side portions of its generally U-shaped recess, according to an embodiment.
Figure 5D:
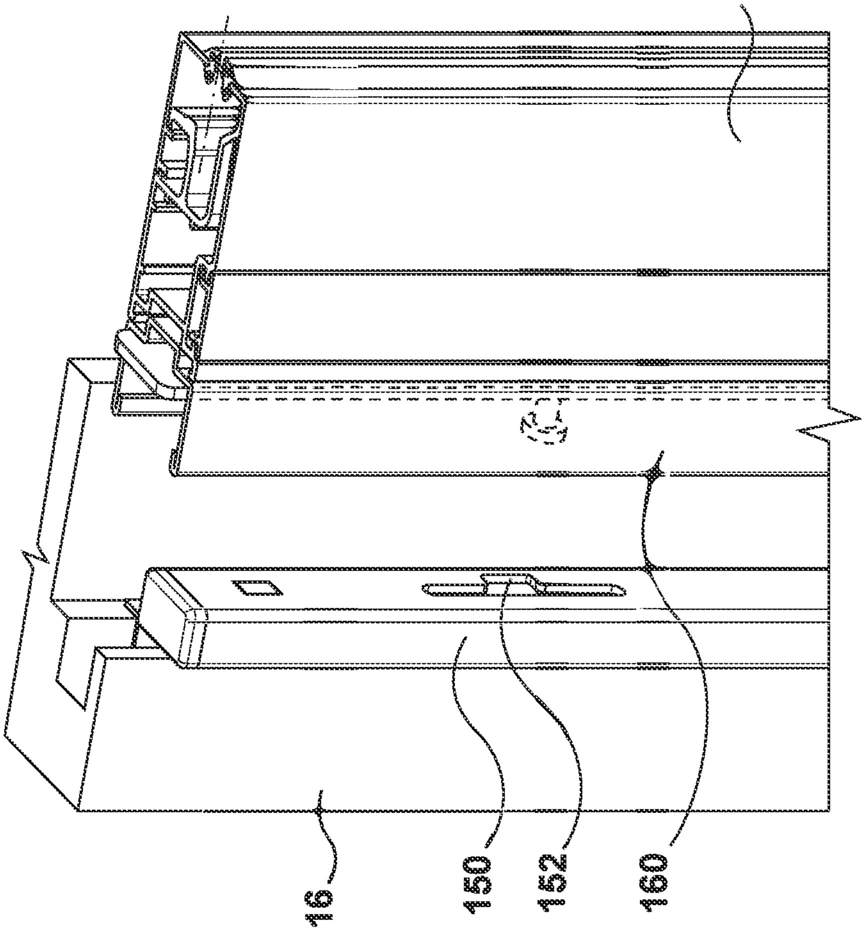
FIG. 5D illustrates a perspective view of the strike plate of FIGS. 5A and 5C ready to receive the locking apparatus, according to an embodiment.
Figure 5G:
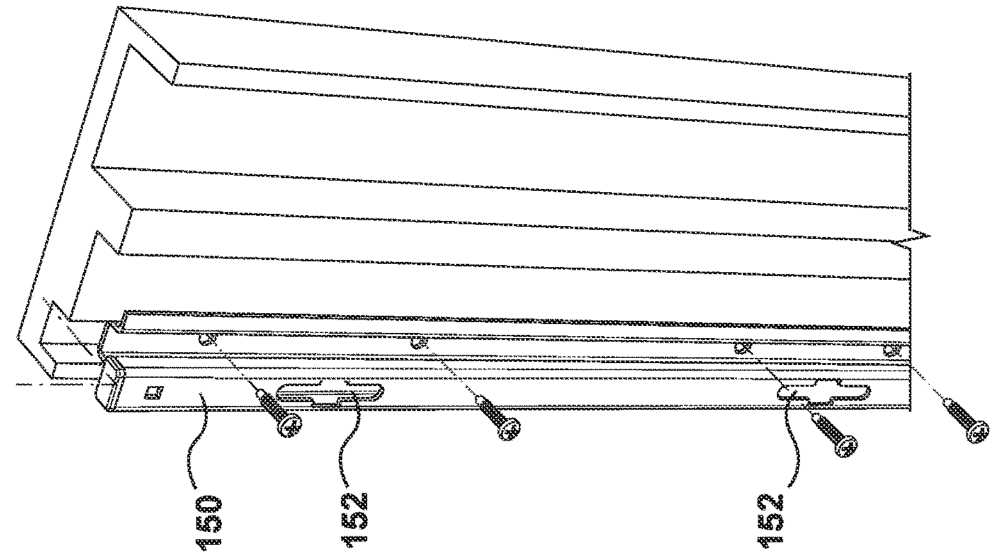
FIG. 5G illustrates a perspective view of a strike plate being installed, according to an embodiment.
Figure 5F:
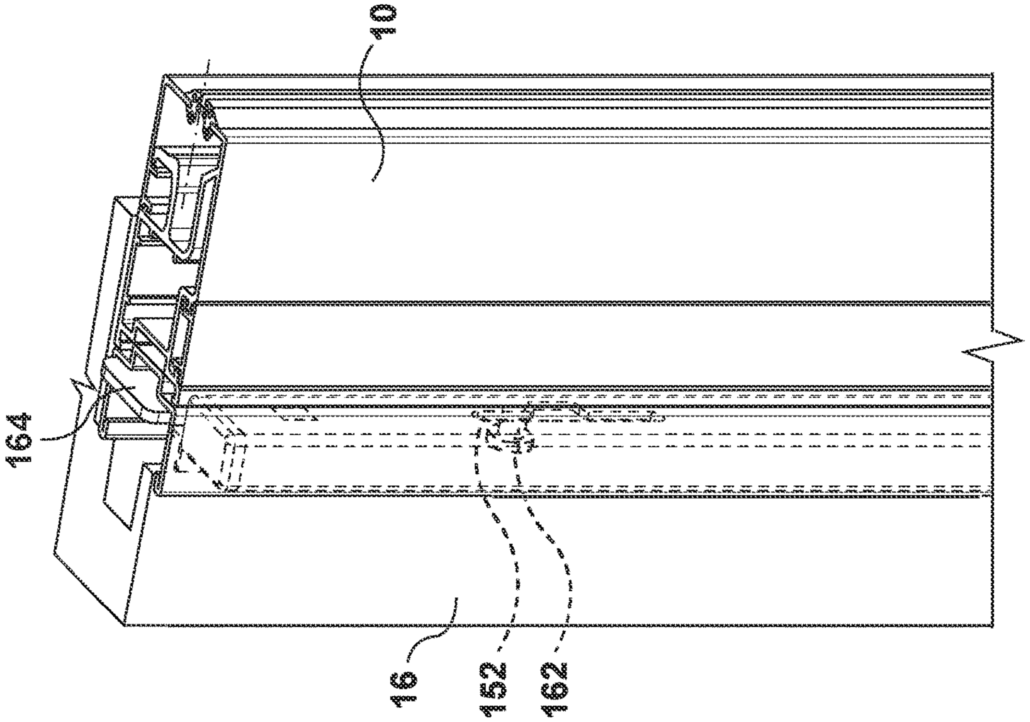
FIG. 5F illustrates a perspective view of the strike plate of FIG. 5E receiving the locking apparatus and the locking apparatus being vertically slid within the strike plate for locking, according to an embodiment.
Figure 5I:
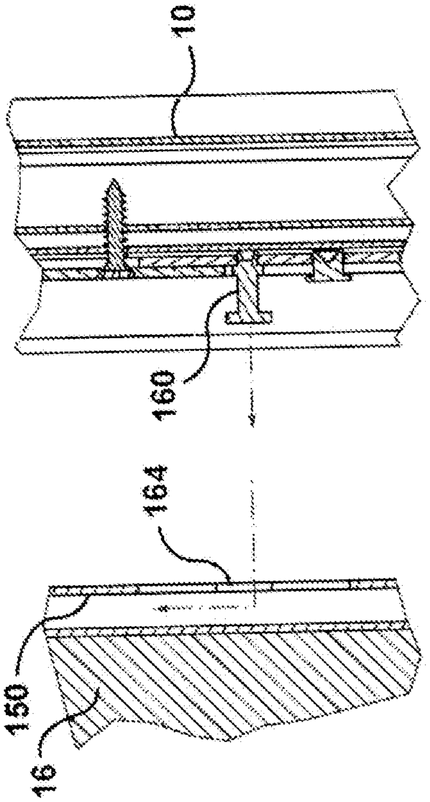
FIG. 5I illustrates a cross-sectional view of the locking apparatus preparing to engage with the slot of the strike plate, according to an embodiment.
Figure 5J:
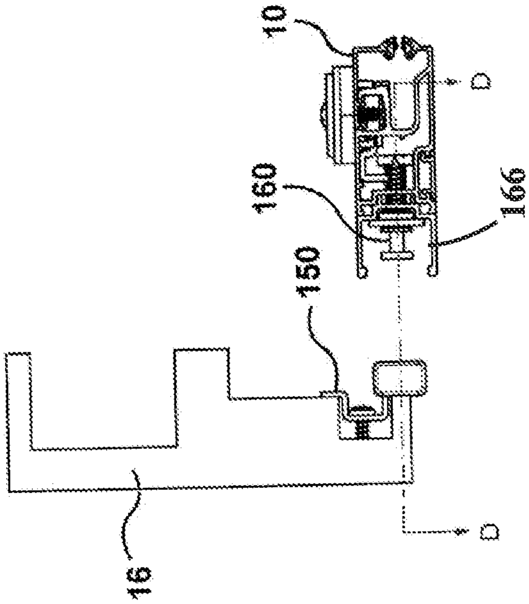
FIG. 5J illustrates a top plan view of FIG. 5I, according to an embodiment.
Figure 5H:
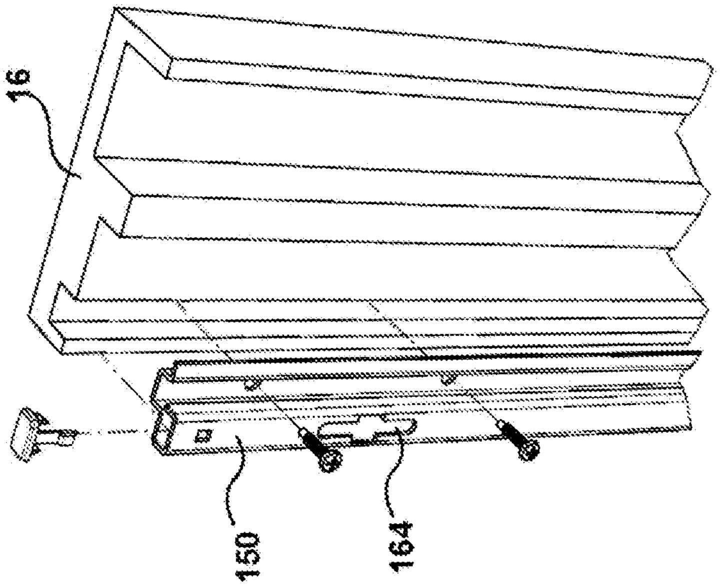
FIG. 5H illustrates another perspective view of a strike plate being installed having at least one slot, according to an embodiment.
Figure 5K:
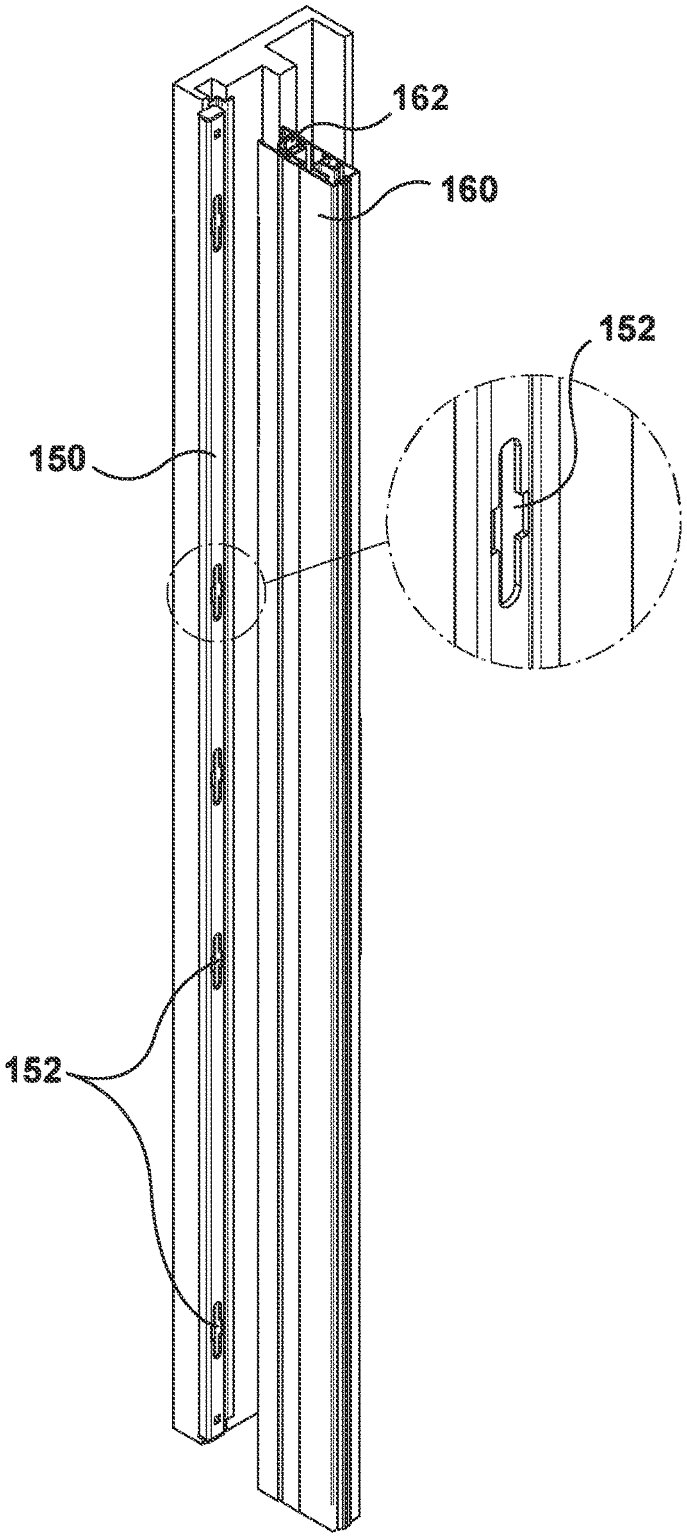
FIG. 5K illustrates another perspective view of a strike plate aligned with a locking mechanism for use on one side of the door frame, according to an embodiment.
Figure 5L:
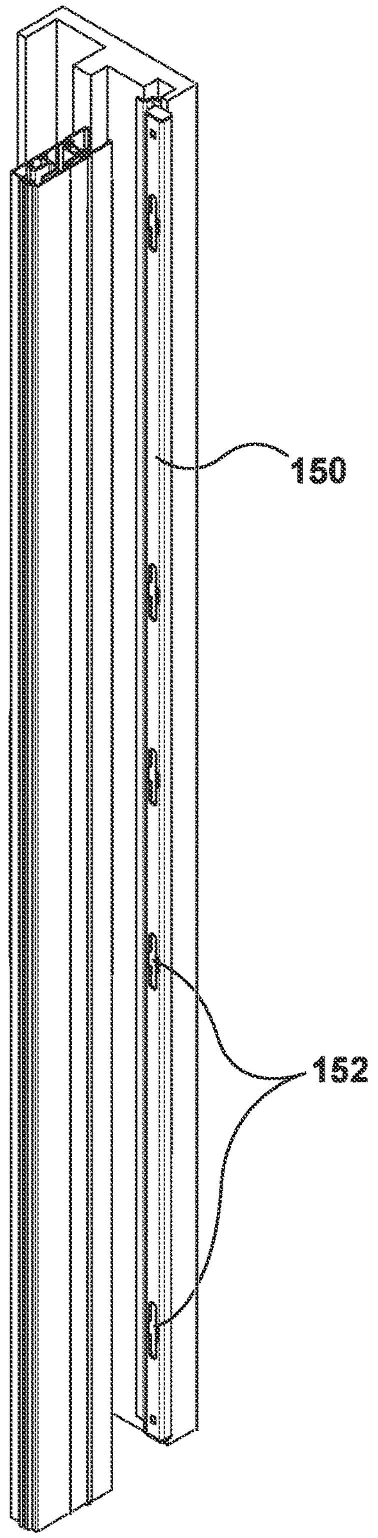
FIG. 5L illustrates another perspective view of a strike plate aligned with a locking mechanism for use on an opposing side of the door frame, according to an embodiment.
Figure 5M:
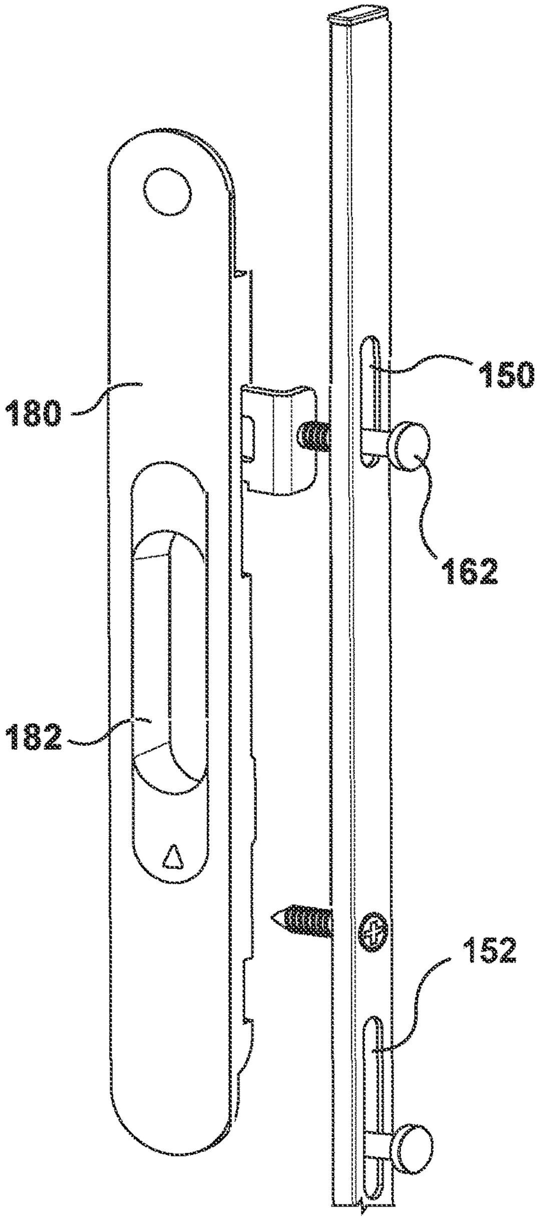
FIG. 5M illustrates a perspective view of the strike plate of FIG. 5L having at least one slot and receiving the pegs of the locking mechanisms, according to an embodiment.
Figure 5N:
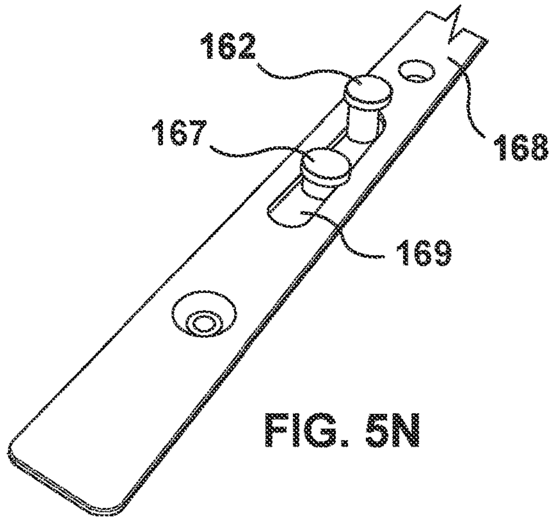
FIG. 5N illustrates a perspective view of a housing piece of the locking mechanism, according to an embodiment.
Figure 5O:
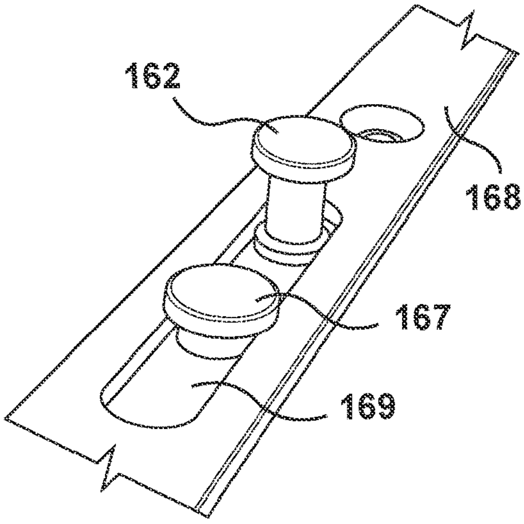
FIG. 5O illustrates another perspective view of the housing piece of the locking mechanism, according to an embodiment.
Figure 5P:
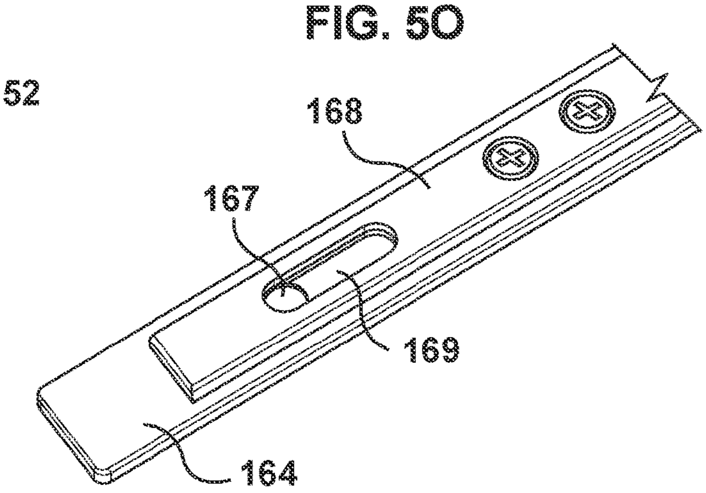
FIG. 5P illustrates a perspective view of the sliding bar mounted to the housing piece of the locking mechanism, according to an embodiment.

Now making reference to FIGS. 5A-5P, in a further embodiment, a strike plate 150 may be secured to a door jamb or frame 16 for providing a striking surface for the sliding panel 10 when closed. A locking apparatus 160 is mounted to an edge of the sliding panel 10, the locking apparatus 160 having at least one locking peg 162 that extends toward the strike plate 150. At least one slot 152 is provided within the strike plate 150 that aligns with and receives the at least one locking peg 162 from the sliding panel 10. The locking apparatus 160 has a housing with a generally U-shaped recess 166 for receiving the strike plate 150. The side portions of the U-shaped recess 166 embrace the sliding panel 10 when closed, and the slots 152 of the strike plate 150 receive the pegs 162 of the locking apparatus 160.

The strike plate 150 may be of unitary construction as shown in the accompanying figures or it may be composed of multiple parts so long as the at least one slot 152 aligns with the at least one locking peg 162.

In some embodiments, the at least one locking peg 162 is a mushroom head peg vertically slidable relative to the sliding panel 10 to removably lock the mushroom head peg into the slot 152 as shown. Therefore, the slot 152 may be as shown in FIG. 5H with an expanded center for receiving the mushroom head peg 162. Alternatively, any portion of the slot 152, such as the bottom portion, may be expanded for receiving the mushroom head peg 162. A sliding portion 164 of the locking apparatus 160 may then be lifted to slide the mushroom head pegs 162 within the slots 152 when received to a narrower portion of the slot 152. Once slid, for example, upwardly, as shown in FIG. 5F, the mushroom head peg 162 is effectively limited from being pulled out of the slot 152 given the narrower portion of the slot 152. To disengage, the sliding portion 164 of the locking apparatus 160 can be vertically slid in an opposing direction until the mushroom head peg 162 aligns with the expanded portion of the slot 152 such that it can then be removed when the door is pulled open.

The sliding portion 164 may, for example, be a slidable bar 164 as shown in the accompanying figures. The slidable bar 164 may be slidably mounted to a housing piece 168 at the bottom of the U-shaped recess 166 of the locking apparatus 160. To allow slidable mounting, the slidable bar 164 is engaged in slot openings 169 of the housing piece 168 with a fastener 167 extending into the housing 168 and sliding panel 10. Although any suitable fastener can be used, such as a pin 167 as shown in the accompanying drawings, it would have a head wider than the slot openings 169 to allow engagement and sliding.

Thus, as shown in the drawings, when the sliding panel 10 is closed, the mushroom head pegs 162 of locking apparatus 160 align with and engage the slots 152 of the strike plate 150. To lock, a handle 180 may be provided on the locking apparatus 160 which has a user-facing guide 182 connected to the interior slidable bar 164. When, for example, moved up or down, the guide 182 moves or slides the interior slidable bar 164 such that the mushroom head pegs 162 located on the slidable bar 164 move along with the slidable bar 164 to lock within the slots 152 of the strike plate 150. The slidable bar 164 is located under the housing piece 168 so that housing piece 168 holds the slidable bar 164 in place. The mushroom head pegs 162 extend from the slidable bar 164 through the slot openings 169 of the housing piece 168 to allow movement or sliding.

Although only one slot 152 is shown, for example, in FIG. 5H, any number of slots may be provided as shown, for example, in FIGS. 5B, 5K and 5L. The locking apparatus 160 may have a complementary number of locking pegs 160, and the locking pegs 160 would be aligned to engage with the slots 152.

In some embodiments, such as those shown in FIGS. 15-17B, the locking apparatus 160 is replaced with a lock 260 and the strike plate 150 is replaced by a strike plate 250 and a latch channel 254. The lock 260 may have any of the features and/or characteristics of the locking apparatus 160 described above and the strike plate 250 may have any of the features and/or characteristics of the strike plate 150 described above.

The latch channel 254 is configured to mount to the frame 16. In some embodiments, the latch channel 254 is mounted in the frame 16 distal to the fixed panel 18. In many instances, the frame 16 may not provide a straight vertical surface for locking the sliding panel 10 to the frame 16. Some embodiments of the security sliding barrier 200 comprise at least one shim 40 or a plurality of shims 40. The shim 40 is configured to be positioned between the latch channel 254 and the frame 16 and is configured to support the latch channel 254 on the frame 16. Though shims for use in leveling or plumbing a structure are known, the shims 40 are unique because they are configured to removably stack together and hold each other together. Each shim 40 may have a ridge 42 on a first side 44 of the shim 40 and a groove 46 on a second side 48 of the shim 40 opposite the first side 44. Each groove 46 is configured to mate with the ridge 42 of an adjacent shim 40 to hold the plurality of shims 40 together. In some embodiments, the shims 40 are configured to snap together. Thus, multiple shims 40 can be used in the same location without fear of the shims 40 slipping off of each other. The shims 40 can therefore be used to plumb the latch channel 254. The latch channel 254 thus provides a straight vertical surface. This improves the strength and security of the security sliding barrier 200 when locked. The latch channel 254 may be attached to the frame 16 with a plurality of screws extending through the latch channel 254 and into the frame 16. In embodiments with shims 40, the screws may extend through the shims 40 as well.

Additionally, the latch channel 254 extends the location of the lock out more into the doorway or window and creates more space for the mechanisms involved in the lock 260 and the strike plate 250. For example, the lock 260 may comprise a lock cover 264 (see FIG. 15) attached to the sliding panel 10 along the first side 20 or the first side sash 30. The lock cover 264 is configured to extend away from the sliding panel 10 and toward the frame 16 and the latch channel 254 and is configured to cover the connection between the latch channel 254 and the lock 260.

The lock 260 may be mounted on the outer side of the first side sash 30 or the first side 20 of the sliding panel 10 and comprises at least one protrusion 262 that is configured to extend toward the frame 16 and the latch channel 254. The strike plate 250 is separate and/or removable from the latch channel 254 and is configured to attach to the latch channel 254. In some embodiments, the strike plate 250 is adjustable and has a position with respect to the latch channel 254 that is adjustable. The security sliding barrier 200 may have at least one strike plate 250, but in many embodiments, has two, three, four, or more strike plates 250. The security sliding barrier 200 may have equal numbers of strike plate 250 and protrusions 262 on the lock 260. Each strike plate 250 has a receiver 252 that is configured to align with the corresponding protrusion 262 and receive the protrusion 262 when the security sliding barrier 200 moves to the closed position within the frame 16.

Figure 17A:
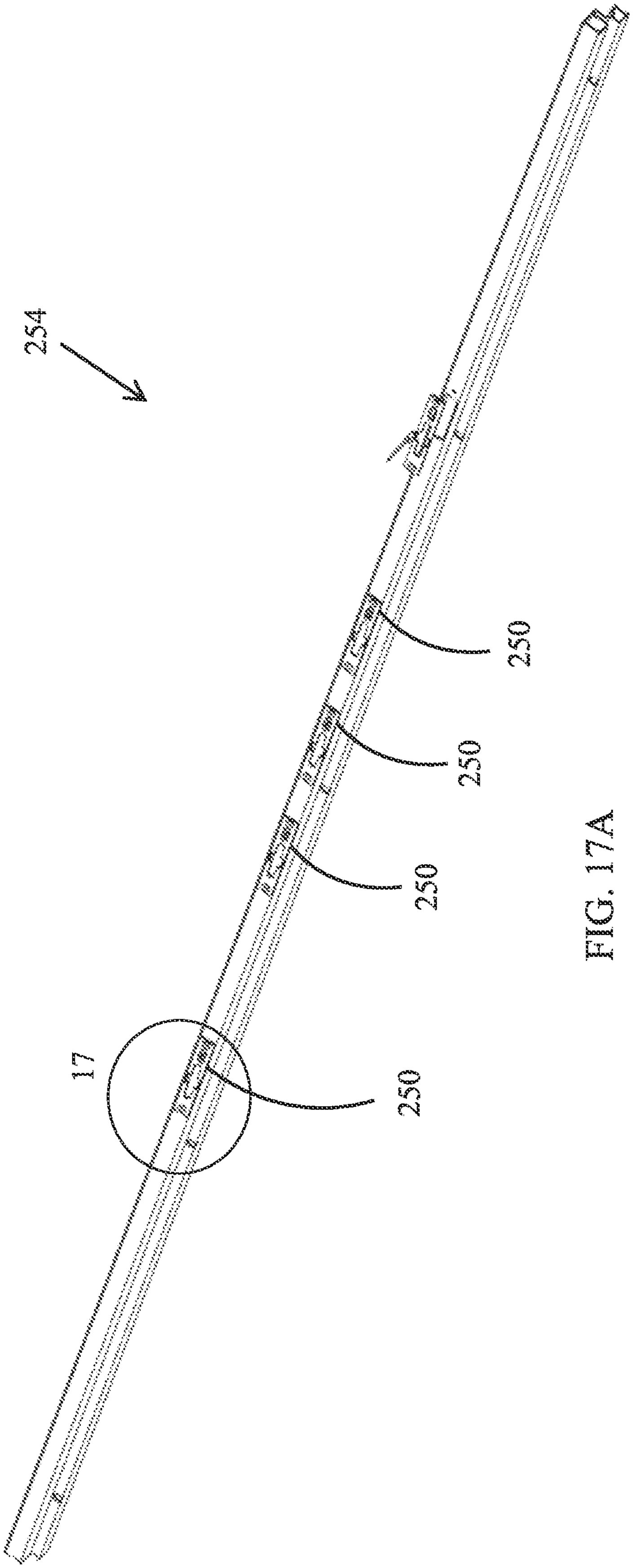
FIG. 17A illustrates a perspective view of the latch channel with adjustable strike plates.
Figure 17B:
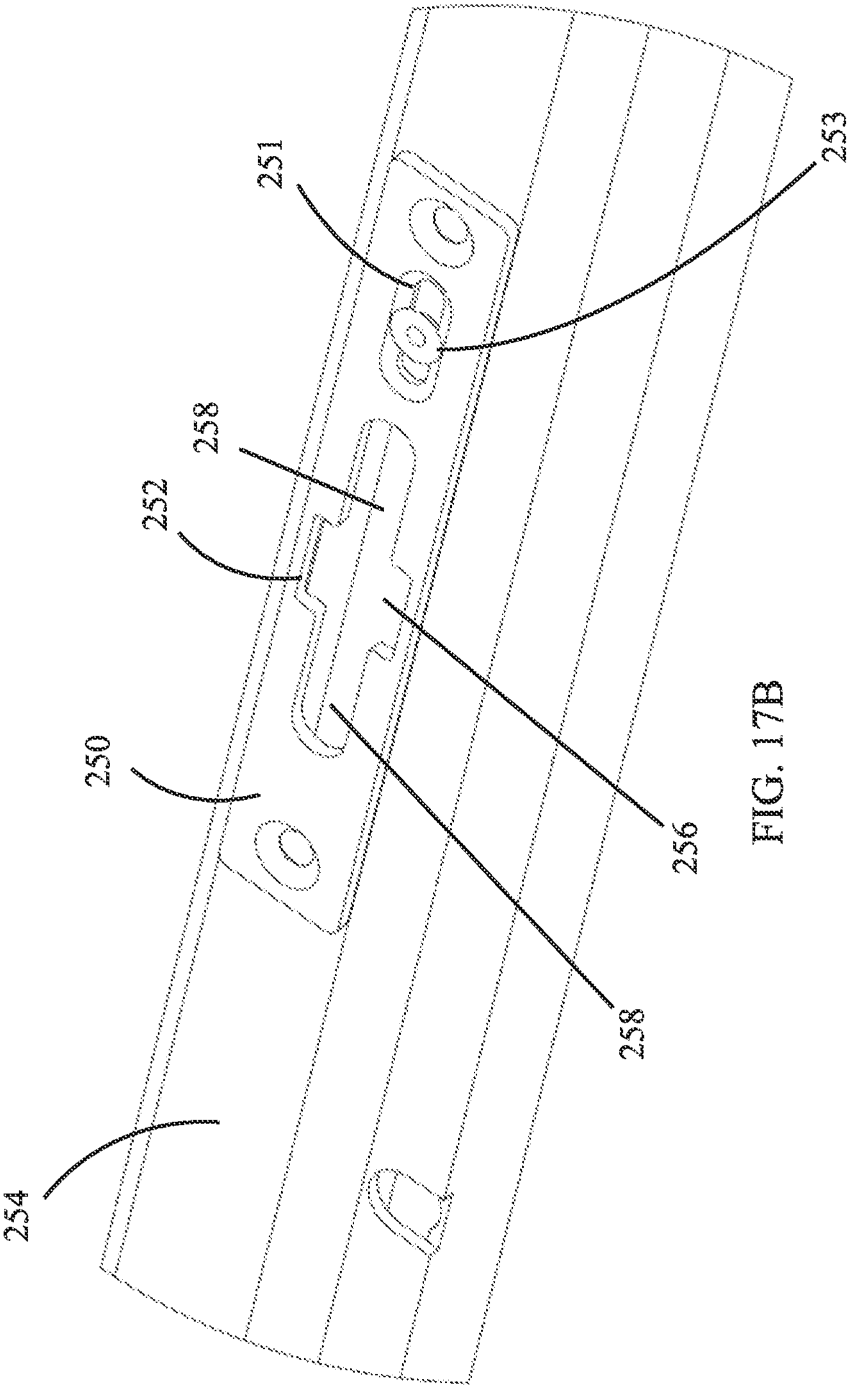
FIG. 17B illustrates a close-up view of an adjustable strike plate attached to the latch channel taken from circle 17 in FIG. 17A.

In some embodiments, the protrusion 262 is a peg with a mushroom head configuration (see FIG. 18) and the receiver 252 is a keyhole slot with a wide portion 256 and a narrow portion 258 (see FIGS. 17A-17B). In such embodiments, the protrusion 262 is slidable with respect to the first side sash 30 or the first side 20 of the sliding panel 10 in a direction parallel with the first side 20. The head 266 of the protrusion 262 may fit through the wide portion 256 and can then slide up or down behind the narrow portion 258, where the neck 268 of the protrusion 262 fits through the narrow portion 258 but the head 266 does not, thus locking the protrusion 262 within the receiver 252. Thus, by sliding the protrusion 262 with respect to the first side 20 of the sliding panel 10, the sliding panel 10 can be locked to the latch channel 254 and the frame 16.

As mentioned above, the strike plate 250 may be adjustable in position with respect to the latch channel 252. In some embodiments, the strike plate 250 has an elongated hole 251 extending therethrough, as shown in FIG. 17B. The elongated hole 251 allows the strike plate 250 to be attached to the latch channel 254 by extending a rivet, screw, or other fastener 253 through the elongated hole 251 and into the latch channel 254, but still allow the strike plate 250 to move with respect to the latch channel 254 until the strike plate 250 is fixed in place with another fastener. Thus, the strike plate 250 is configured to slidably couple to the latch channel 254 and may have a rivet 253 extending through the elongated hole 251. Any other type of fastener, such as a screw, may be implemented in place of the rivet 253. This may help improve the function of the lock 260 because each strike plate 250 can be specifically aligned with the corresponding protrusion 262 during installment rather than manufacturing the strike plate 150 and hoping that the components will align. Additionally, over time, the strike plate 250 may need to be adjusted as the house shifts to keep the protrusions 262 and the receivers 252 aligned. By having an adjustable strike plate 250, this adjustment can be easily performed.

Figure 18:
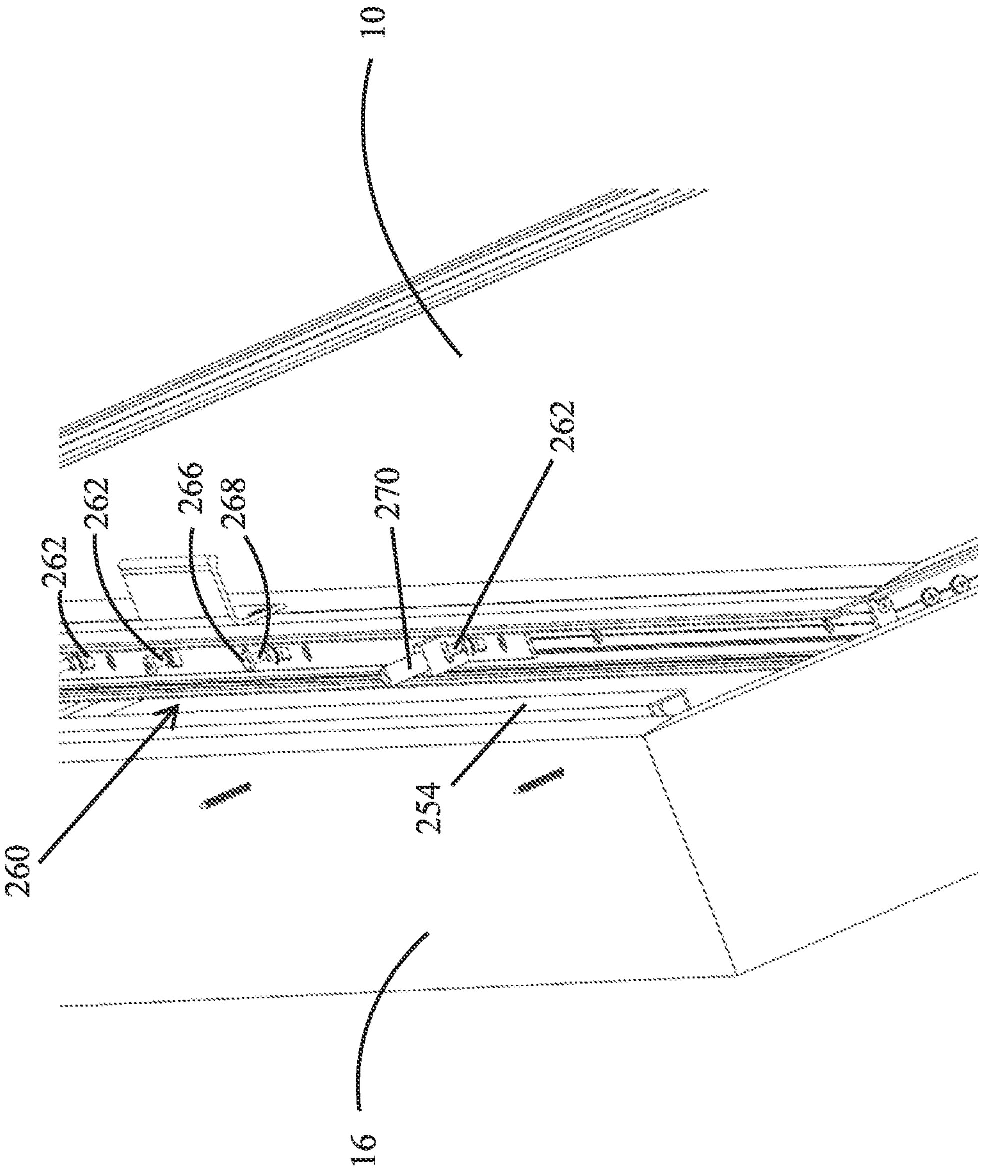
FIG. 18 illustrates a bottom perspective view of the lock with a locator tool attached to one of the protrusions.

The security sliding barrier 200 may also comprise a locator tool 270, as shown in FIG. 18. The locator tool 270 is configured to removably couple to the protrusion 262. Without the locator tool 270, it is difficult to see where to align the receiver 252 of the strike plate 250 with the protrusion 262 because the sliding panel 10 is so close to the strike plate 250 once the protrusion 262 is near to the strike plate 250. By placing the locator tool 270 onto the protrusion 262, the alignment can be better measured and the receiver 252 can be properly aligned with the protrusion 262. In some embodiments, the locator tool 270 has a cross section sized and shaped to fit the receiver 252 so that when the locator tool 270 is pressed into the receiver 252, the locator tool 270 can only enter all the way if the receiver 252 is properly aligned. Thus, when the locator tool 270 is coupled to the protrusion 262, the locator tool 270 is configured to extend into the receiver 252 of the strike plate 250 and adjust the position of the strike plate 250 to center the protrusion 262 within the receiver 252.

In another embodiment, a different locking system is envisioned other than the mushroom head pegs 162 and slots 152 described above. For example, a combination of hooks and eyes, latches and receivers or any other locking system as will be known to one with skill in the art may be used.

Figure 6A:
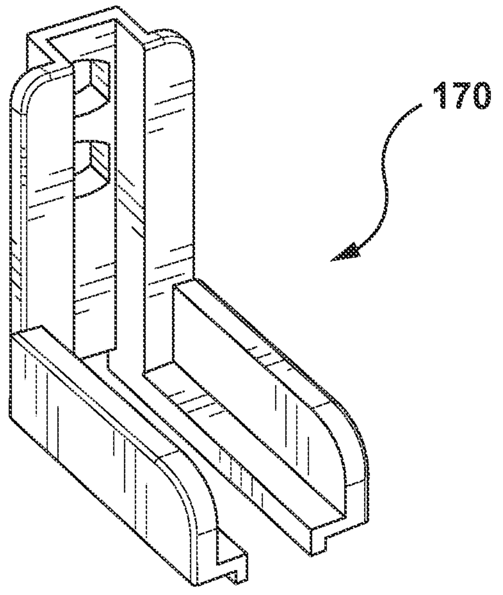
FIG. 6A illustrates a perspective view of a lift protector, according to an embodiment.
Figure 6B:
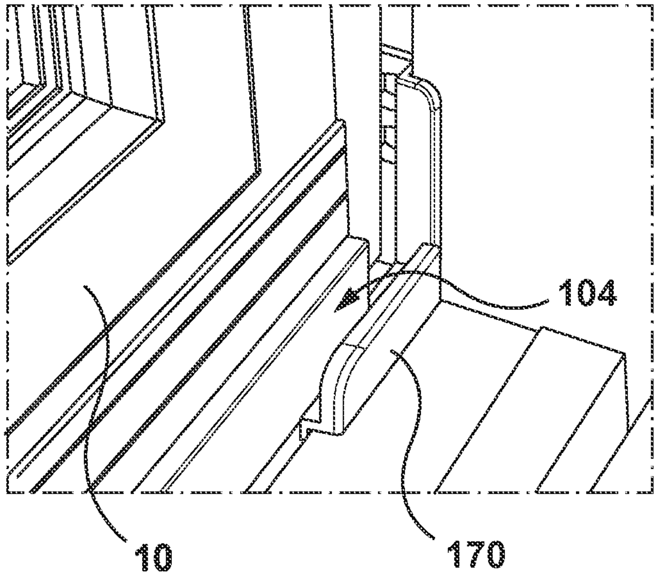
FIG. 6B illustrates an alternate perspective view of the lift protector of FIG. 6A in use with a sliding panel, according to an embodiment.
Figure 7:
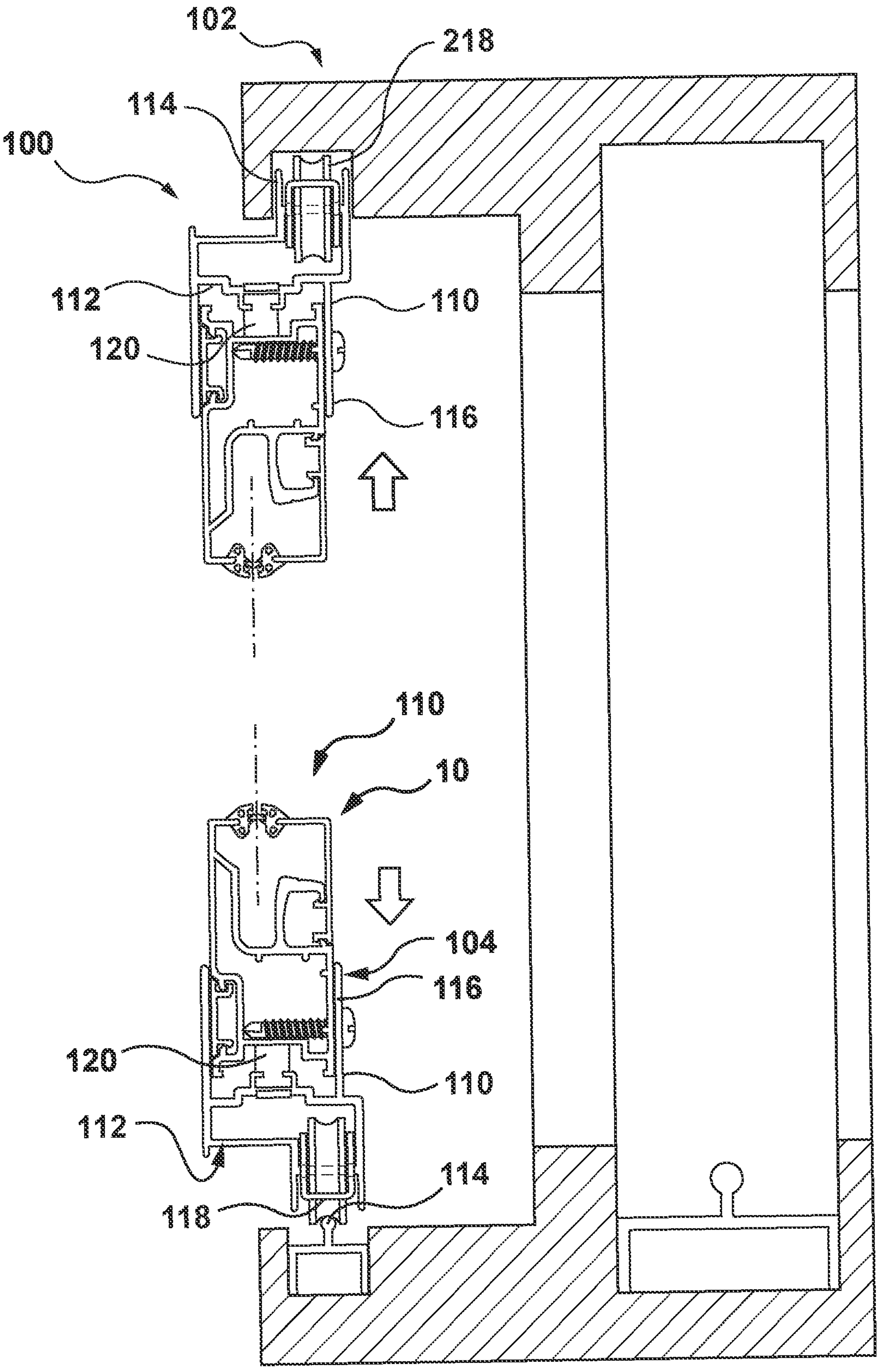
FIG. 7 illustrates a cross-sectional view of a mounting apparatus having an upper and lower member and encasing an upper and lower edge portion of a sliding panel and further having adjustable rollers, according to an embodiment.
Figure 8A:
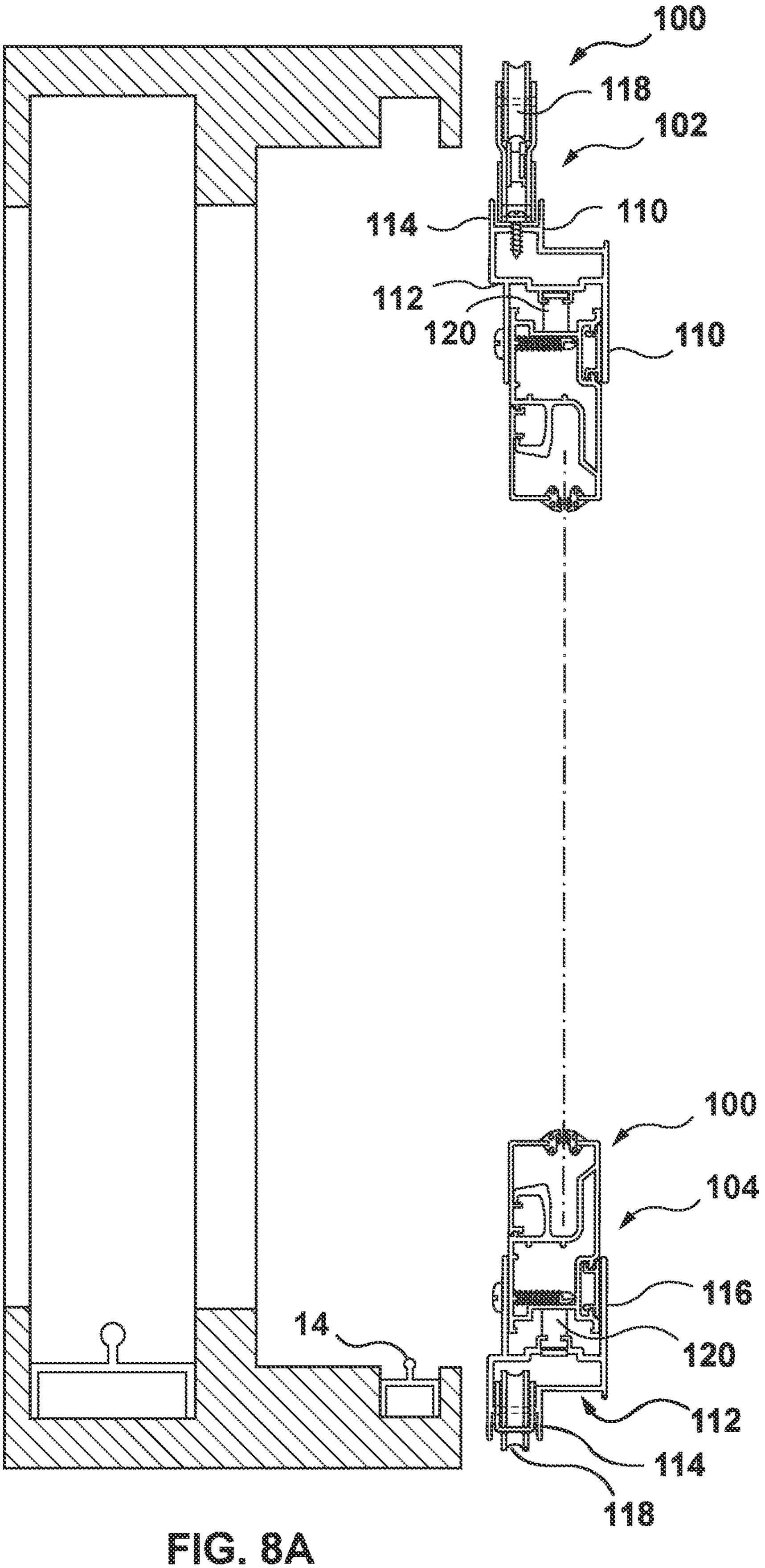
FIG. 8A illustrates a cross-sectional view of the mounting apparatus of FIG. 7 having upper and lower members installed on a sliding panel and the sliding panel being prepared for insertion by loosening the screws of the adjustable U-channel, according to an embodiment.
Figure 8B:
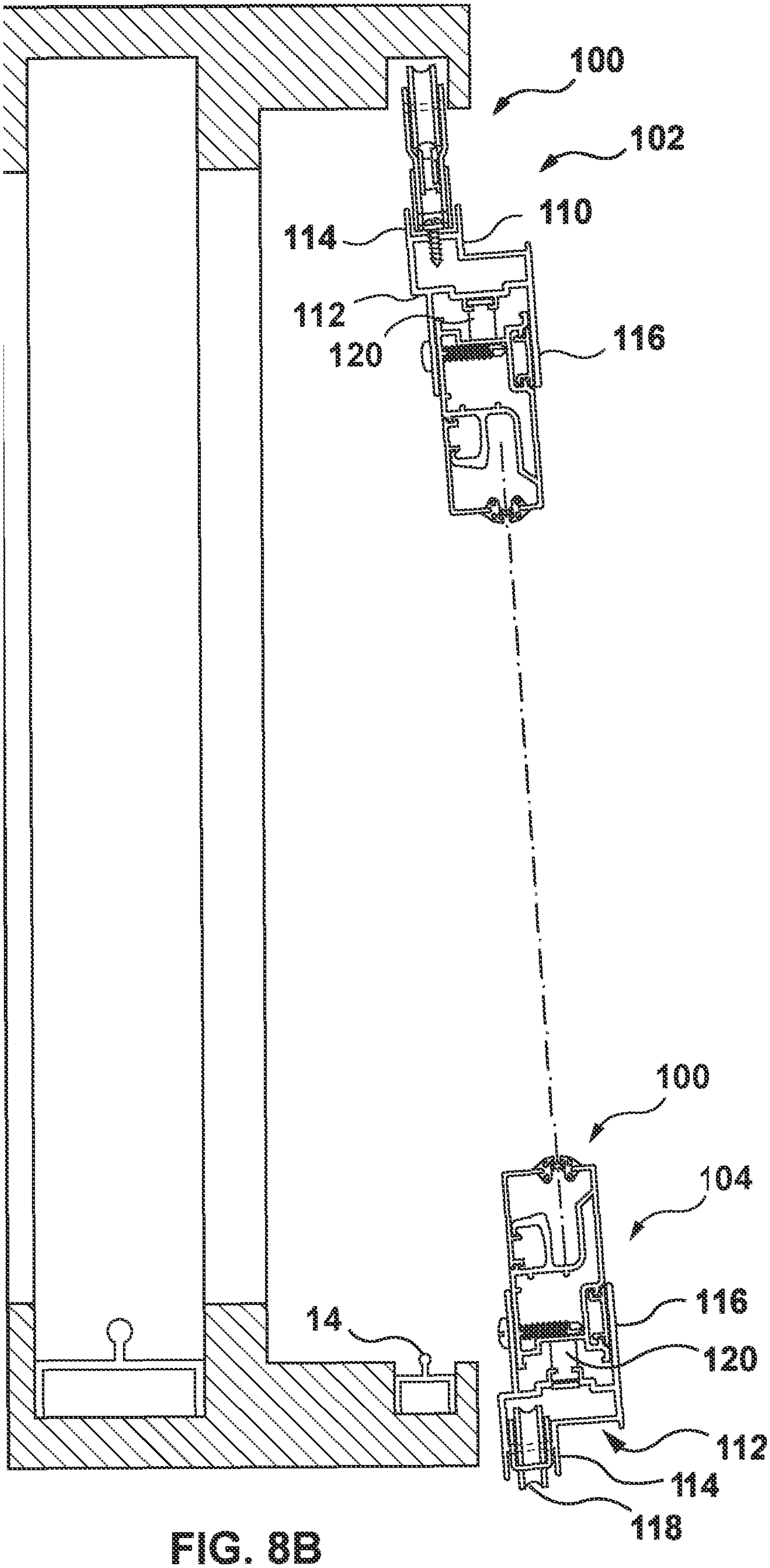
FIG. 8B illustrates the sliding panel having the mounting apparatus of FIG. 8A being tilted on one end to insert the sliding panel into a frame, according to an embodiment.
Figure 8C:
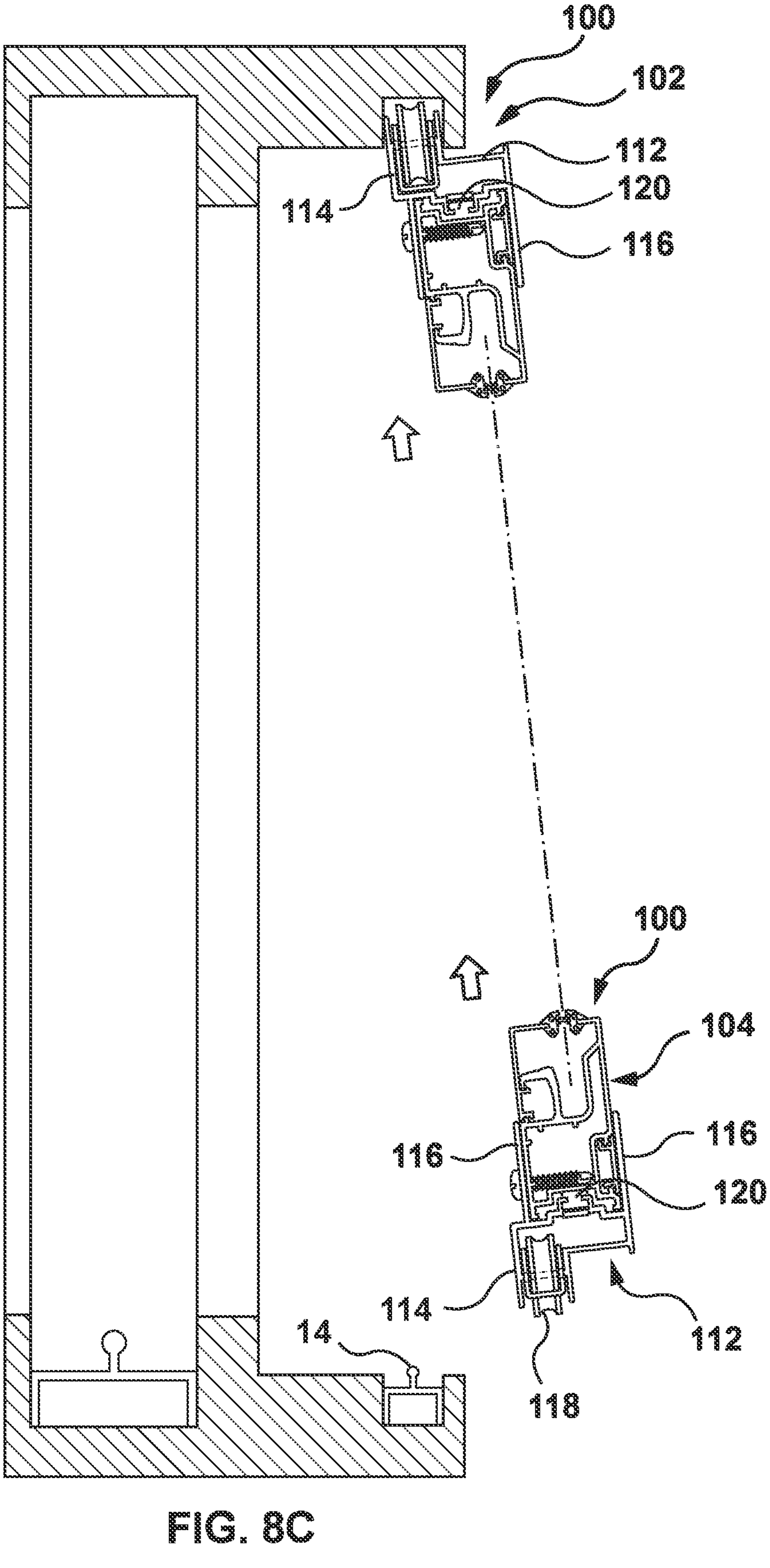
FIG. 8C illustrates the sliding panel having the mounting apparatus of FIG. 8A being lifted from the other end to adjust the U-channel upward to allow installation into the frame, according to an embodiment.
Figure 8D:
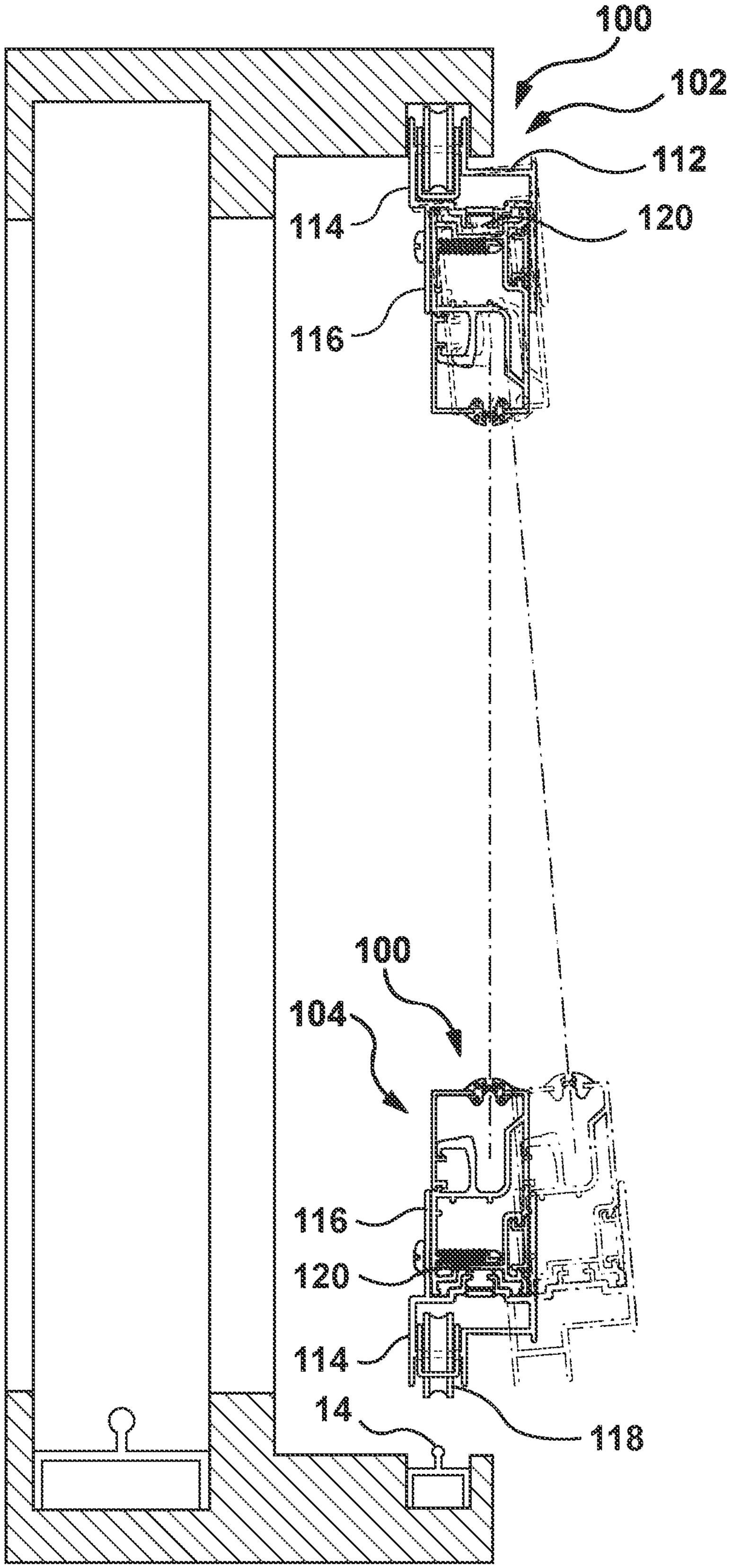
FIG. 8D illustrates the sliding panel having the mounting apparatus of FIG. 8A being straightened from a tilted position on the other end to insert the sliding panel into the frame, according to an embodiment.
Figure 8E:
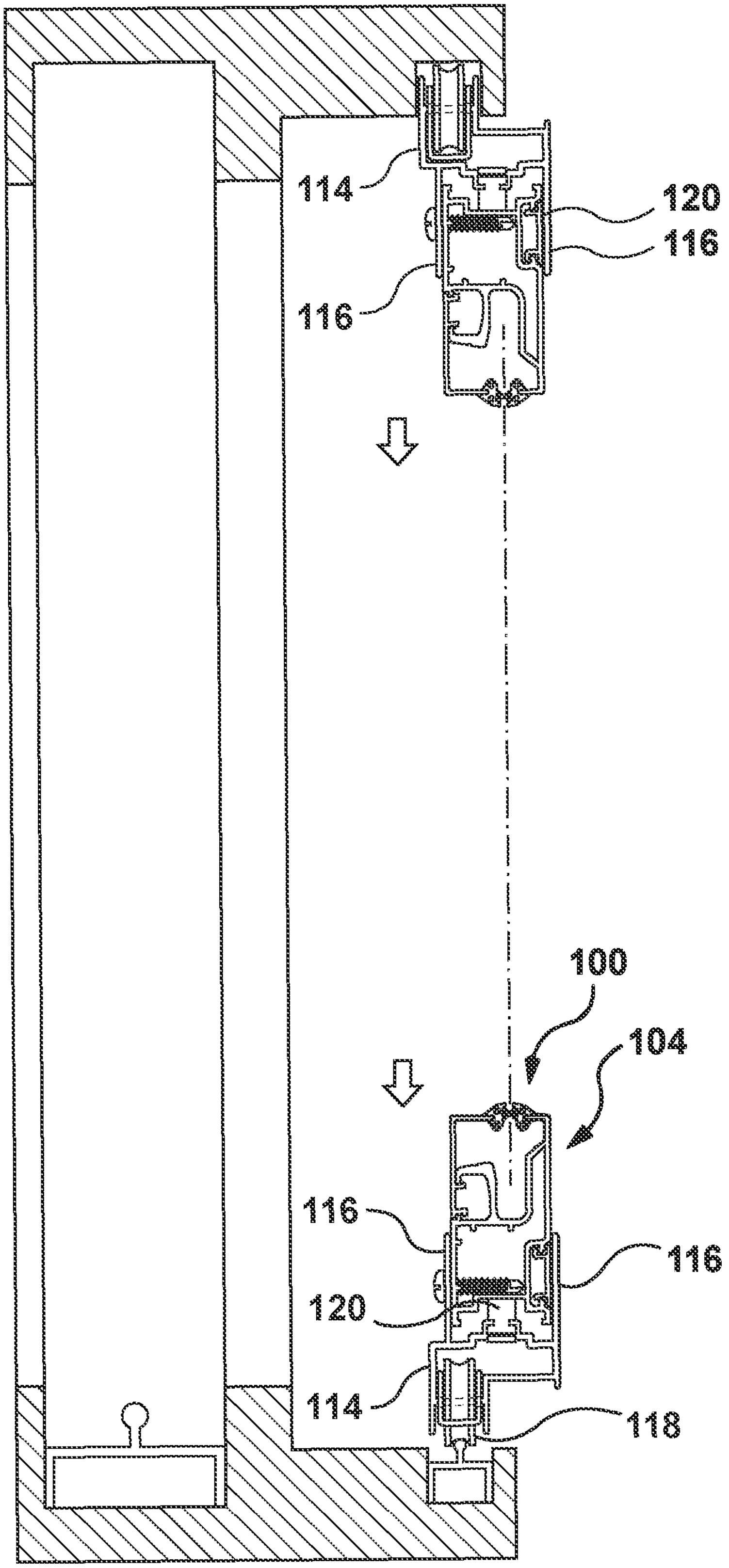
FIG. 8E illustrates the sliding panel having the mounting apparatus of FIG. 8A being released to release the adjustable U-channel for installation into the frame and the sliding panel being installed by tightening the screws of the adjustable U-channel, according to an embodiment.

In still another embodiment, a generally L-shaped lift protector 170 may be provided that is configured to be secured to a corner of a frame 16 in which the sliding panel 10 is receivable to inhibit removal of the sliding panel 10 from the track 14 when the sliding panel 10 is in the closed position. When closed, the L-shaped lift protector engages a corner of the mounting apparatus 100 to limit removal of the sliding panel 10 from the track 14, as shown, for example, in FIGS. 6A and 6B. The lift protector 170 may be inserted around the corner of the mounting apparatus 100 so that the elbow of the L-shaped lift protector 170 cradles the corner of the mounting apparatus 100. This can simply be slid around the corner or may be further reinforced with fasteners such as screws. When engaged with the housing 110, the L-shaped lift protector 170, prevents access to the edge of the housing 110 with a prying tool, providing further security.

Figure 19A:
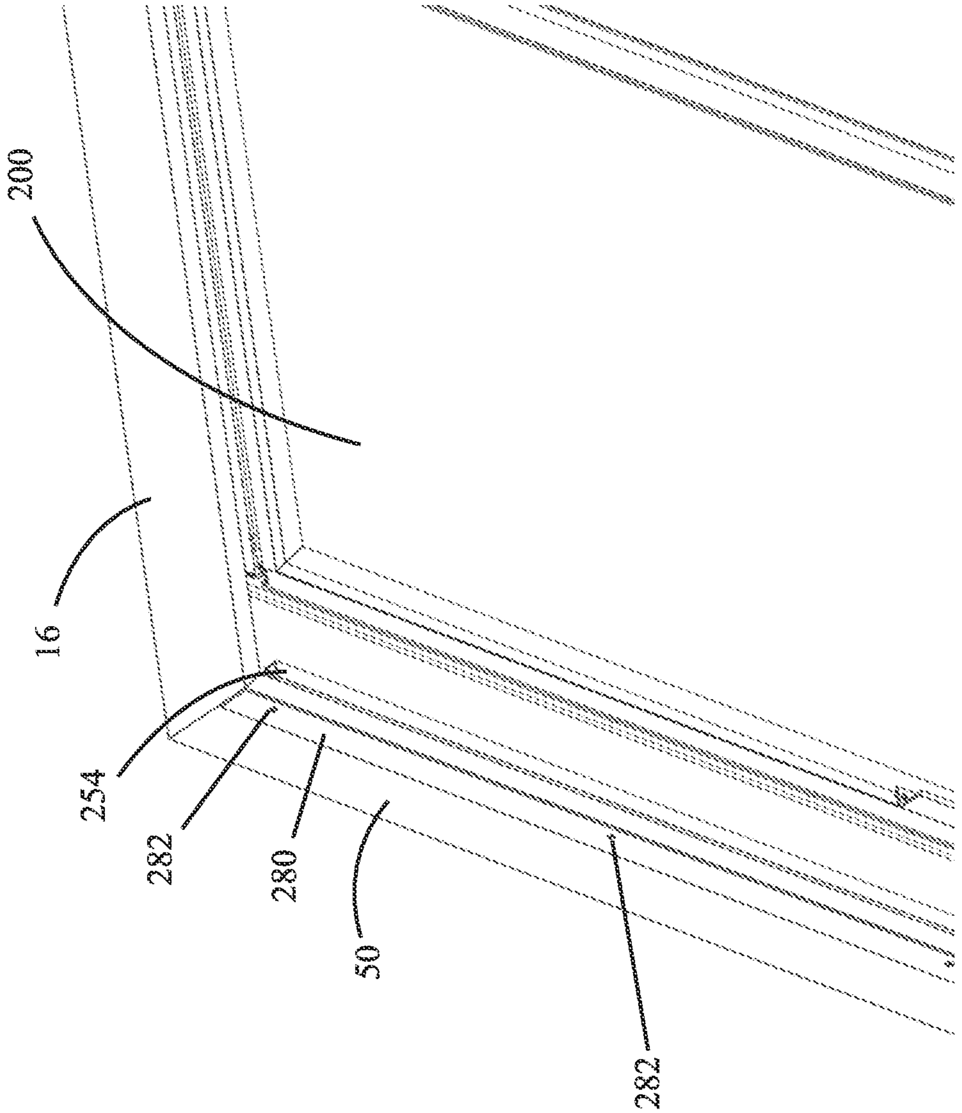
FIG. 19A illustrates a close-up view of a backer plate attached to an outside surface of the frame.
Figure 19B:
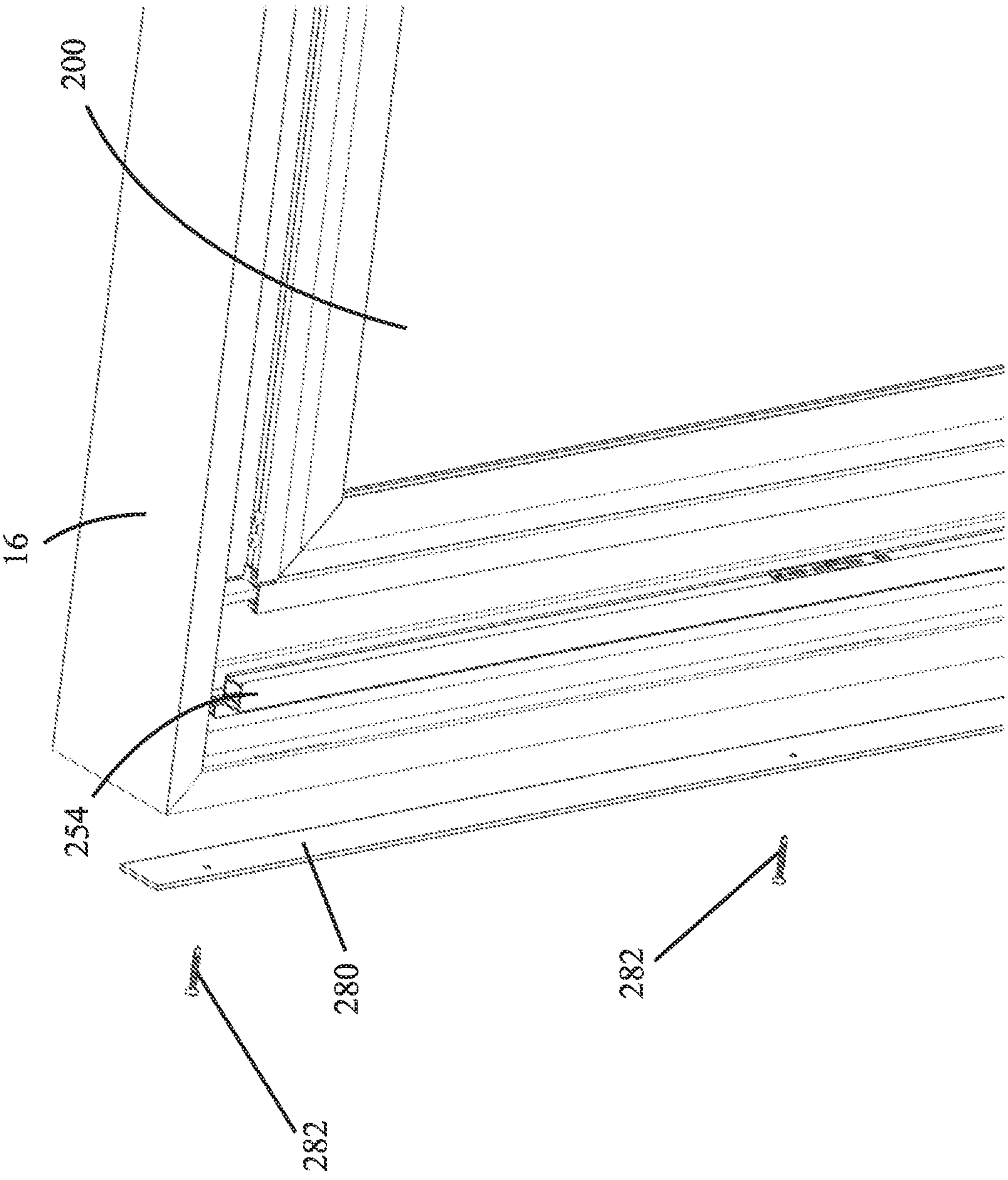
FIG. 19B illustrates an exploded view of the backer plate shown in FIG. 19A.
Figure 19C:
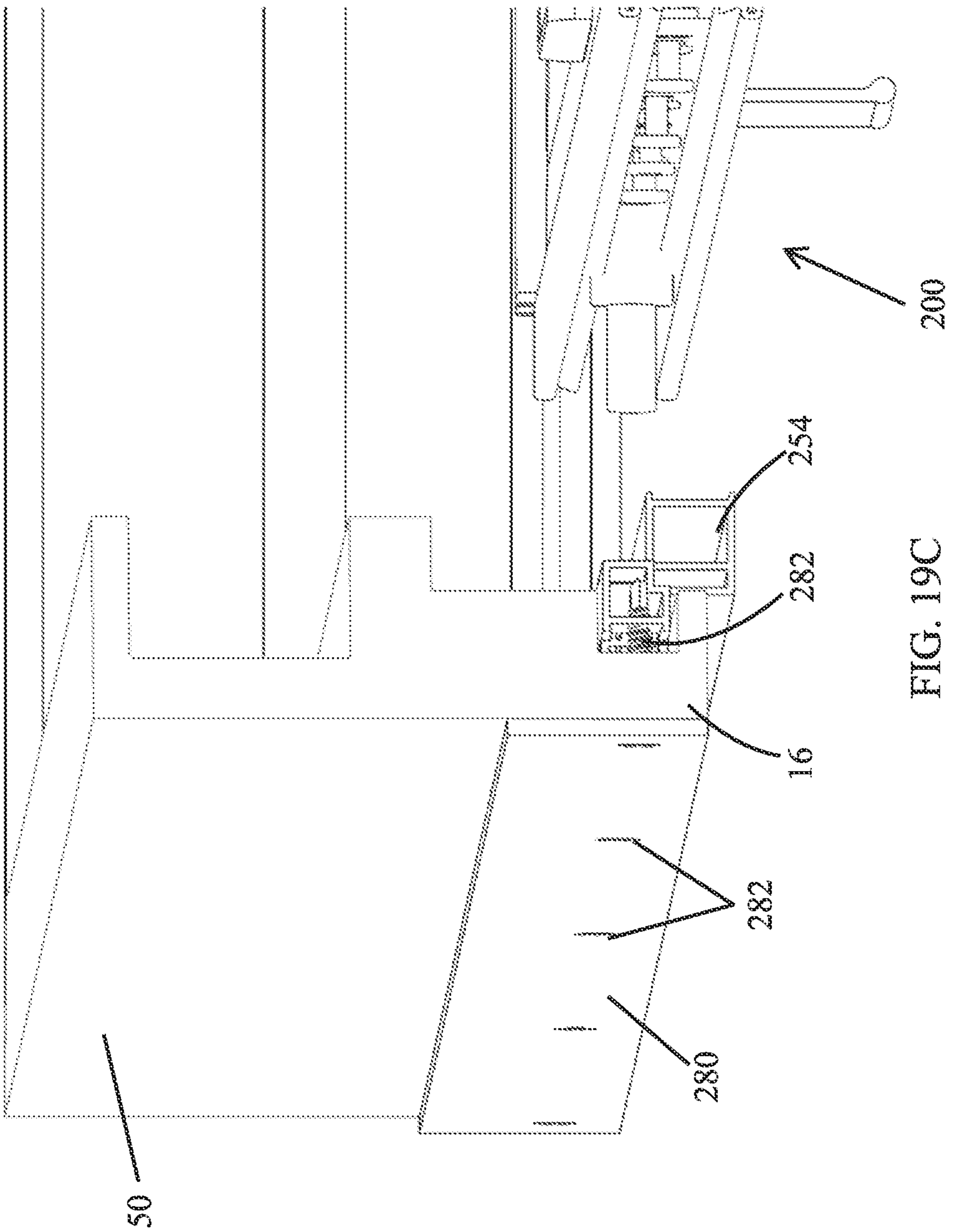
FIG. 19C illustrates a cross section view of the backer plate, showing the backer plate attached to the frame and the latch channel by a screw that extends through the frame and into the latch channel.

The security sliding barrier 200 may also comprise a backer plate 280 that is configured to attach to an outside surface 50 of the frame 16, as shown in FIGS. 19A-19C. The backer plate 280 may be attached to the outside surface 50 by one or more screws 282 that are configured to extend through the backer plate 280 and the frame 16 and into the latch channel 254, as shown in FIG. 19C. In this way, the latch channel 254 can be more securely attached to the frame 16. Once the frame 16 is installed in the doorway, the backer plate 280 is no longer accessible, and thus the screws 282 cannot be removed. In some embodiments, the backer plate 280 is elongated and extends along the frame 16. The backer plate 280 may be formed of aluminum and may have any size or shape. In some embodiments, the backer plate 280 is configured to conform to the outer surface 50 of the frame 16.

In use, this disclosure provides for the replacement of the sliding door with a security sliding door that includes an upper member 102 and a lower member 104 each engaging an upper and lower edge portion 12 of a sliding panel 10. Each of the upper and lower members, 102, 104, has a housing 110 having a generally U-shaped channel 116 running along an inner side 112 of the housing 110 for receiving a respective upper and lower edge portion 12 of the sliding panel 10. Each of the upper member 102 and lower member 104 has at least one roller 118 or 218 extending from an outer side 114 that opposes the inner side 112 of the housing 110 for slidingly engaging the upper and lower tracks 14. The upper and lower members 102 and 104 can have the features as described above such as an interlocking assembly 130, or strike plate 150 and locking apparatus 160 combination, and/or a lift protector 170.

It will be understood that implementations of a security sliding barrier are not limited to the specific assemblies, devices and components disclosed in this document, as virtually any assemblies, devices and components consistent with the intended operation of a security sliding barrier may be used. Accordingly, for example, although particular security sliding barriers, and other assemblies, devices and components are disclosed, such may include any shape, size, style, type, model, version, class, measurement, concentration, material, weight, quantity, and/or the like consistent with the intended operation of security sliding barriers. Implementations are not limited to uses of any specific assemblies, devices and components; provided that the assemblies, devices and components selected are consistent with the intended operation of a security sliding barrier.

Accordingly, the components defining any security sliding barrier may be formed of any of many different types of materials or combinations thereof that can readily be formed into shaped objects provided that the materials selected are consistent with the intended operation of a security sliding barrier. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various security sliding barriers may be manufactured using conventional procedures as added to and improved upon through the procedures described here. Some components defining a security sliding barrier may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling security sliding barriers are not limited to the specific order of steps as disclosed in this document. Any steps or sequence of steps of the assembly of a security sliding barrier indicated herein are given as examples of possible steps or sequence of steps and not as limitations, since various assembly processes and sequences of steps may be used to assemble security sliding barriers.

The implementations of a security sliding barrier described are by way of example or explanation and not by way of limitation. Rather, any description relating to the foregoing is for the exemplary purposes of this disclosure, and implementations may also be used with similar results for a variety of other applications employing a security sliding barrier.

What is claimed is:

1. A security sliding barrier for a window or door, comprising:

a sliding panel configured to sit within a frame of the window or door and impede passage of objects through the window or door;

a sash assembly surrounding the sliding panel, the sash assembly having a top sash, a bottom sash, a first side sash, and a second side sash, wherein each of the top sash, the bottom sash, the first side sash, and the second side sash has an inner side configured to couple with the sliding panel and an outer side facing away from the sliding panel:

at least two top rollers extending away from the outer side of the top sash and configured to engage with a top track of the frame;

at least two bottom rollers extending away from the outer side of the bottom sash and configured to engage with a bottom track of the frame;

a latch channel configured to mount to the frame;

a lock mounted on the outer side of the first side sash, the lock comprising at least one protrusion configured to extend toward the latch channel;

at least one adjustable strike plate configured to attach to the latch channel, each of the at least one adjustable strike plate having a receiver aligned with the at least one protrusion and configured to receive the at least one protrusion when the security sliding barrier moves to a closed position within the frame, wherein the at least one protrusion is slidable with respect to the first side sash in a direction parallel with the first side sash to lock the first side sash to the latch channel and the frame; and an interlock assembly having a fixed interlock and a sliding interlock, the fixed interlock configured to attach to a fixed panel within the frame, wherein the fixed panel is distal to the latch channel, the sliding interlock configured to attach to the second side sash of the sliding panel and engage with the fixed interlock when the security sliding barrier is in the closed position to lock the second side sash of the sliding panel to the fixed panel.

2. The security sliding barrier of claim 1, wherein a position of each of the at least two bottom rollers and each of the at least two top rollers with respect to the sliding panel is individually adjustable.

3. The security sliding barrier of claim 1, wherein each roller of the at least two bottom rollers is pivotably coupled to the bottom sash and has a corresponding adjustment assembly, the adjustment assembly comprising:

an end cap positioned on an end of the bottom sash;

an adjustment block positioned within the bottom sash adjacent to the roller; and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom sash and when the adjustment screw is rotated in a second direction, the adjustment block is moved away from the roller and the roller is pivoted toward the bottom sash.

4. The security sliding barrier of claim 1, wherein the at least one protrusion is a peg with a mushroom head configuration and the receiver of the at least one adjustable strike plate is a keyhole slot.

5. The security sliding barrier of claim 1, wherein each of the at least one adjustable strike plate has an elongated hole extending therethrough and is configured to slidably couple to the latch channel with a rivet or a fastener extending through the elongated hole.

6. The security sliding barrier of claim 1, further comprising a plurality of shims positioned between the latch channel and the frame, wherein each shim of the plurality of shims has a ridge on a first side of the shim and a groove on a second side of the shim opposite the first side, wherein each groove is configured to mate with the ridge of an adjacent shim to hold the plurality of shims together.

7. The security sliding barrier of claim 1, further comprising a locator tool configured to removably couple to the at least one protrusion, wherein when the locator tool is coupled to the at least one protrusion, the locator tool is configured to extend into the receiver of the at least one adjustable strike plate and adjust the position of the at least one adjustable strike plate to center the at least one protrusion within the receiver.

8. A security sliding barrier for a window or door, comprising:

a sliding panel configured to sit within a frame of the window or door and impede passage of objects through the window or door;

at least two bottom rollers extending away from a bottom of the sliding panel and configured to engage with a bottom track of the frame;

a latch channel configured to mount to the frame;

a lock mounted on a first side of the sliding panel, the lock comprising at least one protrusion configured to extend toward the latch channel;

at least one strike plate configured to attach to the latch channel, each of the at least one strike plate having a receiver aligned with the at least one protrusion and configured to receive the at least one protrusion when the security sliding barrier moves to a closed position within the frame, wherein the at least one protrusion is slidable with respect to the sliding panel in a direction parallel with the first side of the sliding panel to lock the sliding panel to the latch channel and the frame; and an interlock assembly having a fixed interlock and a sliding interlock, the fixed interlock configured to attach to a fixed panel within the frame, wherein the fixed panel is distal to the latch channel, the sliding interlock configured to attach to a second side of the sliding panel opposite the first side and engage with the fixed interlock when the security sliding barrier is in the closed position to lock the second side of the sliding panel to the fixed panel.

9. The security sliding barrier of claim 8, wherein a position of each of the at least two bottom rollers with respect to the sliding panel is individually adjustable.

10. The security sliding barrier of claim 8, wherein each roller of the at least two bottom rollers is pivotably coupled to the bottom of the sliding panel and has a corresponding adjustment assembly, the adjustment assembly comprising:

an end cap positioned on a corner of the sliding panel;

an adjustment block positioned on the bottom of the sliding panel adjacent to the roller; and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom of the sliding panel and when the adjustment screw is rotated in a second direction, the adjustment block is moved away from the roller and the roller is pivoted toward the bottom of the sliding panel.

11. The security sliding barrier of claim 8, wherein each of the at least one strike plate has an elongated hole extending therethrough and is configured to slidably couple to the latch channel with a rivet or a fastener extending through the elongated hole.

12. The security sliding barrier of claim 8, further comprising a plurality of shims positioned between the latch channel and the frame, wherein each shim of the plurality of shims has a ridge on a first side of the shim and a groove on a second side of the shim opposite the first side, wherein each groove is configured to mate with the ridge of an adjacent shim to hold the plurality of shims together.

13. The security sliding barrier of claim 8, further comprising a locator tool configured to removably couple to the at least one protrusion, wherein when the locator tool is coupled to the at least one protrusion, the locator tool is configured to extend into the receiver of the at least one strike plate and adjust the position of the at least one strike plate to center the at least one protrusion within the receiver.

14. A security sliding barrier for a window or door, comprising:

a sliding panel configured to sit within a frame of the window or door and impede passage of objects through the window or door;

at least two bottom rollers extending below a bottom of the sliding panel and configured to engage with a bottom track of the frame;

a lock mounted on a first side of the sliding panel and configured to lock the first side of the sliding panel to the frame when the security sliding barrier moves to a closed position within the frame; and an interlock assembly configured to lock a second side of the sliding panel opposite the first side to a fixed panel within the frame when the security sliding barrier is in the closed position.

15. The security sliding barrier of claim 14, further comprising a latch channel configured to mount to the frame, wherein the lock is configured to extend toward the latch channel and lock the first side of the sliding panel to the latch channel when the security sliding barrier moves to the closed position.

16. The security sliding barrier of claim 14, further comprising at least one strike plate configured to attach to the frame, wherein the lock comprises at least one protrusion configured to extend toward the at least one strike plate, each of the at least one strike plate having a receiver aligned with the at least one protrusion and configured to receive the at least one protrusion when the security sliding barrier moves to the closed position, wherein the at least one protrusion is slidable with respect to the sliding panel in a direction parallel with the first side of the sliding panel to lock the first side of the sliding panel to the frame.

17. The security sliding barrier of claim 14, wherein the interlock assembly has a fixed interlock and a sliding interlock, the fixed interlock configured to attach to the fixed panel and the sliding interlock configured to attach to the second side of the sliding panel and engage with the fixed interlock when the security sliding barrier is in the closed position to lock the second side of the sliding panel to the fixed panel.

18. The security sliding barrier of claim 14, wherein a position of each of the at least two bottom rollers with respect to the sliding panel is individually adjustable.

19. The security sliding barrier of claim 14, wherein each roller of the at least two bottom rollers is pivotably coupled to the bottom of the sliding panel and has a corresponding adjustment assembly, each adjustment assembly comprising:

an end cap positioned on a corner of the sliding panel;

an adjustment block positioned on the bottom of the sliding panel adjacent to the roller; and an adjustment screw rotatably coupled to the end cap, accessible through the end cap, and threadedly coupled to the adjustment block, wherein when the adjustment screw is rotated in a first direction, the adjustment block is moved toward the roller and the roller is pivoted away from the bottom of the sliding panel and when the adjustment screw is rotated in a second direction, the adjustment block is moved away from the roller and the roller is pivoted toward the bottom of the sliding panel.

20. The security sliding barrier of claim 14, wherein each of the at least one strike plate has an elongated hole extending therethrough and is configured to slidably couple to the latch channel with a rivet or a fastener extending through the elongated hole.

* * * * *